United States Patent
Bodén et al.

(10) Patent No.: US 12,233,361 B2
(45) Date of Patent: Feb. 25, 2025

(54) FILTER INSERT AND GUIDE ARRANGEMENT

(71) Applicant: VOLVO TRUCK CORPORATION, Gothenburg (SE)

(72) Inventors: Roger Bodén, Kungsbacka (SE); Magnus Svensson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 1575 days.

(21) Appl. No.: 15/759,499

(22) PCT Filed: Sep. 23, 2015

(86) PCT No.: PCT/EP2015/071883
§ 371 (c)(1),
(2) Date: Mar. 12, 2018

(87) PCT Pub. No.: WO2017/050369
PCT Pub. Date: Mar. 30, 2017

(65) Prior Publication Data
US 2018/0257011 A1    Sep. 13, 2018

(51) Int. Cl.
*B01D 29/96* (2006.01)
*B01D 29/21* (2006.01)
(Continued)

(52) U.S. Cl.
CPC .............. *B01D 29/96* (2013.01); *B01D 29/21* (2013.01); *B01D 35/153* (2013.01); *B01D 35/16* (2013.01);
(Continued)

(58) Field of Classification Search
CPC ...... B01D 29/96; B01D 35/16; B01D 35/153; B01D 29/21; B01D 2201/301;
(Continued)

(56) References Cited

U.S. PATENT DOCUMENTS 6,752,924 B2 * 6/2004 Gustafson ............ B01D 29/055
210/232
2012/0181224 A1   7/2012 Rapin
(Continued)

FOREIGN PATENT DOCUMENTS

| CN | 102892475 A | 1/2013 |
|---|---|---|
| CN | 103124874 A | 5/2013 |

(Continued)

OTHER PUBLICATIONS

Chinese Office Action dated Jan. 2, 2020 in CN Application No. 201580083294.1, 6 pages.
(Continued)

*Primary Examiner* — Hayden Brewster
(74) *Attorney, Agent, or Firm* — Venable LLP; Jeffri A. Kaminski

(57) ABSTRACT

A filter insert is provided for being removably arranged in a filter housing and includes a first actuation arrangement positioned at a first end of the filter insert, wherein the first actuation arrangement is adapted for being actuated by a corresponding second actuation arrangement of a filter housing lid for controlling a relative axial movement between the filter insert and the filter housing lid.

39 Claims, 22 Drawing Sheets

(51) Int. Cl.
*B01D 35/153* (2006.01)
*B01D 35/16* (2006.01)
*F01M 1/10* (2006.01)
*F01M 11/03* (2006.01)

(52) U.S. Cl.
CPC .............. *F01M 1/10* (2013.01); *F01M 11/03* (2013.01); *B01D 2201/24* (2013.01); *B01D 2201/291* (2013.01); *B01D 2201/295* (2013.01); *B01D 2201/301* (2013.01); *B01D 2201/304* (2013.01); *B01D 2201/306* (2013.01); *B01D 2201/4007* (2013.01); *B01D 2201/4015* (2013.01); *B01D 2201/4046* (2013.01); *F01M 2001/1057* (2013.01); *F01M 2011/031* (2013.01)

(58) Field of Classification Search
CPC .......... B01D 2201/291; B01D 2201/24; B01D 2201/295; B01D 2201/304; B01D 2201/306; B01D 2201/4007; B01D 2201/4015; B01D 2201/4046; F01M 1/10; F01M 11/03; F01M 2001/1057; F01M 2011/031
USPC ........................................................ 210/435
See application file for complete search history.

(56) References Cited

U.S. PATENT DOCUMENTS

| 2013/0075319 | A1* | 3/2013 | Roesgen | ................ | B01D 29/96 |
| | | | | | 210/232 |
| 2014/0183116 | A1* | 7/2014 | Ardes | .................... | B01D 29/88 |
| | | | | | 210/234 |
| 2015/0157967 | A1 | 6/2015 | Krause et al. | | |

FOREIGN PATENT DOCUMENTS

| DE | 10353424 | A1 | 6/2005 |
| DE | 102013202449 | A1 | 8/2014 |
| EP | 2168651 | A1 | 3/2010 |
| EP | 2201993 | A1 | 6/2010 |
| WO | 2006012031 | A1 | 2/2006 |
| WO | 2012059472 | A1 | 5/2012 |

OTHER PUBLICATIONS

International Search Report (May 24, 2016) for corresponding International App. PCT/EP2015/071883.
1 European Office Action dated Dec. 4, 2019 in EP Application No. 15767485.4, 6 pages.

* cited by examiner

FILTER INSERT AND GUIDE ARRANGEMENT

BACKGROUND AND SUMMARY

The invention relates to a filter insert and a filter arrangement for cleaning a fluid. More specifically, the filter arrangement is adapted for cleaning a fluid for an internal combustion engine, wherein the fluid may be a liquid such as a lubricating oil or fuel or a gas such as air. Such filter arrangements may be provided onboard vehicles and in other applications containing transport systems to remove unwanted solids or other contaminants from the fluid. The filter insert may alternatively be called filter cartridge, filter module or filter element.

The filter insert comprises a filter material body, which may be in the form of a cylindrical folded paper structure defining an inner space. The filter insert may further comprise a first end panel arranged on a first side of the filter material body and a second end panel arranged on a second side of the filter material body.

The filter arrangement comprises a filter housing, which may be non-removably attached to the internal combustion engine. The filter housing may be cup-shaped with an upper open, access end for receipt of the filter insert in an internal compartment. The filter housing encompasses at least one inlet for raw fluid to be filtered, which empties into a raw side of the filter housing compartment, and an outlet, which starts at a clean side of the filter housing compartment, for filtered clean fluid. The filter insert is arranged to be cross-flowed in a radial manner by the fluid. The inlet and outlet may be provided in a lower portion of the filter housing. The filter housing defines a longitudinal axis, along which the filter insert can be inserted into the filter housing and removed from it. The filter arrangement further comprises a removable lid for closing the open end of the filter housing during operation. The filter housing and the lid are normally provided with complimentary shaped threads for a rotational attachment of the lid to the filter housing. The lid may alternatively be called cover or cap.

The invention can be applied in an internal combustion engine, such as a diesel engine, for heavy-duty vehicles, such as trucks, buses and construction equipment. Although the invention will be described with respect to a diesel engine for a truck, the invention is not restricted to this particular application, but may also be used in other types of engines and for other types of vehicles, such as passenger cars.

US 2012/0267293 discloses a liquid filter including a filter housing, a ring filter insert and a cover. The housing bottom contains an outlet for emptying the housing when the filter insert is removed. The filter insert includes a filter material body surrounded by front panels. A blocking element for the outlet is arranged on one front panel, and positioning elements are provided on the filter insert and on the housing. The positioning elements include an inclined plane and an engaging radially protruding nose. The inclined plane is arranged on one and the nose is arranged on the other of the filter housing pan and the ring filter insert. When the ring filter insert is rotated relative to the filter housing, the inclined plane and the nose are moved in relation to each other such that they slide along each other and engage the blocking element with the outlet.

It is desirable to provide a filter insert, which creates conditions for inserting a new filter insert into the filter housing in a secure way to an operative position.

According to an aspect of the present invention, a filter insert is provided for being removably arranged in a filter housing, characterized in that the filter insert comprises a first actuation means positioned at a first end of the filter insert, wherein the first actuation means is adapted for being actuated by a corresponding second actuation means of a filter housing lid for controlling a relative axial movement between the filter insert and the filter housing lid.

The term "relative axial movement" is defined as a movement in parallel with a centre axis of the filter insert between the first end and a second end, opposite the first end, when the filter insert is aligned with the filter housing lid so that the centre axis of the filter insert coincides with a centre axis of the lid. Further, with regard to the filter housing, the axial movement may coincide with a filter housing longitudinal axis, along which the filter insert can be inserted into the filter housing and removed from it. In other words, the centre axis of the filter insert, the centre axis of the lid and the longitudinal axis of the housing coincide in a symmetry axis during insertion and removal of the filter insert relative to the housing. When in the following, the terms "radial", "axial" and "circumferential" are used, this refers to the symmetry axis in the mounted state of the filter system. The same holds true for the centre axis and longitudinal axis, respectively, when not mounted.

According to one example, the first actuation means is arranged to face outwards from the first end in an axial direction of the filter insert. The position of the actuation means creates conditions for being actuated by the filter housing lid and especially during fastening of the lid to the filter housing. According to one example, the second actuation means of the filter housing lid is complimentary shaped to the first actuation means of the filter insert for achieving the controlled relative axial movement.

This filter insert design allowing axial movement between the filter insert and the filter housing lid creates conditions for simplifying the activities during filter insert insertion and removal. According to one example, the filter housing lid is attached to the filter housing via fastening means, wherein the filter insert may be designed so that engagement and disengagement, respectively, of the fastening means may actuate the actuation means so that the filter insert is moved relative to the lid and also in relation to the filter housing.

According to one embodiment example, the first actuation means is adapted for controlling a relative circumferential movement between the filter insert and the filter housing lid. According to one example, the fastening means is adapted for a turning movement of the filter lid relative to the filter housing around a longitudinal axis of the filter housing so that a center axis of the lid coincides with the longitudinal axis of the filter housing.

According to one embodiment example, the first actuation means is adapted for controlling the relative circumferential movement between the filter insert and the filter housing lid simultaneously with the relative axial movement between the filter insert and the filter housing lid.

This embodiment example creates conditions for a new design different from conventional designs, where the lid is fastened to the filter housing via a threaded structure, wherein the lid is fastened to the filter housing via a rotational movement several turns and there is no relative axial movement between fife lid and the filter insert. More specifically, the invention creates conditions for decreasing cost of ownership and leadtime at the work-shop. For example, the invention creates conditions for removal of use for special tools to produce the turning torque to install the engine oil filter properly, decreased time for service, and decreased cost of ownership and/or decreased cost kw service contracts, due to less time spent gathering and putting back tools from cabinets. It also creates conditions for making the service easier, by reducing the forces used by a service technician, wherein an ergonomical benefit is achieved.

Preferably, the fastening means of the lid and the filter housing are designed for a relative turning movement of less than a complete turn and especially less than half a complete turn and especially less than a quarter of a complete turn, which creates conditions for a quick attachment and removal of the lid from the housing.

According to one embodiment example, the first actuation means is adapted for transferring a turning movement of the filter housing lid to a linear movement of the filter insert.

According to one embodiment example, the first actuation means comprises an external contact surface defining a projection or recess. The projection or recess preferably faces outwards in an axial direction of the filter insert. Thus, the first end of the filter insert has a varying height in the axial direction formed by the projection or recess.

According to a further development of the last-mentioned embodiment example, the projection or recess forms part of a structure with varying extension in an axial direction of the filter insert along a circumferential direction of the filter insert. The varying extension may either be formed discontinuously (abruptly) or continuously such as via at least one ramp in the circumferential direction of the filter insert on an external surface of the filter insert.

According to one embodiment example, the first actuation means is eccentrically positioned at the first end of the filter insert. In this way, a lid with a complimentary shaped second actuation means (such as a ran rp in its circumferential direction) may act on the first actuation means when the lid is fastened to the filter housing via a turning movement.

According to one embodiment example, the filter insert comprises a first end panel at the first end of the filter insert and wherein the actuation means is rigidly attached to or forms an integral pan of the first end panel. This creates conditions for a space and cost efficient construction.

According to one embodiment example, the filter insert comprises a closing means positioned at a second end of the filter insert, opposite the first end, for controlling opening and closing, respectively, of an aperture in a bottom region of the filter housing. The filter insert may be designed so that closing of the aperture via the closing means will be performed automatically when the lid is fastened to the filter housing and the first actuation means is actuated by the lid, which creates conditions for a secure operation and time-efficient filter insert insertion in that there is no separate activity required by a service technician for closing the aperture. The closing means may also be called blocking element. The aperture may be formed by a drainage outlet.

According to this example, the complete filter insert forms a kind of push rod, wherein a linear force is transmitted from the actuation means at the first end of the filter insert to the closing means at the second end of the filter insert via the filter material body and/or a central tubular structure connecting end panels at the first end and the second end of the filter insert.

According to one example, the closing means is eccentrically positioned at the first end of the filter insert.

According to one embodiment example, the closing means is formed by a body arranged to sealingly engage the aperture. The closing means may be formed by a projection with an outer circumference matched to an inner circumference of the aperture for achieving the sealing effect.

According to one embodiment example, the filter insert comprises a second end panel at the second end of the filter insert and wherein the closing means is rigidly attached to or forms an integral part of the second end panel. This creates conditions for a space and cost efficient construction.

According to a further development of the list-mentioned embodiment example, the closing means is arranged to project in an axial direction of the filter insert from a main portion of the second end panel. According to one example, the second end panel comprises a plate shaped structure extending in a direction perpendicular to the axial direction of the filter insert.

According to one embodiment example, the closing means forms a drainage valve actuating means. Thus, in this example, the aperture in the filter housing is formed by a drainage valve.

According to one embodiment example, the actuation means is adapted for transferring a turning movement of the filter housing lid to a linear movement for closing and opening respectively, the aperture via the closing means.

According to one embodiment example, the filter insert comprises, a first guiding means arranged for engaging a corresponding second guiding means of the filter housing for guiding the filter insert relative to the filter housing.

This creates conditions for a reliable positioning of the filter insert inside the filter housing.

The first guiding means is preferably separate from the first actuation means and further preferably axially spaced from the first actuation means. The first guiding means is preferably configured for guiding the filter insert during insertion into the filter housing and removal from the filter housing. Preferably, the first guiding means is adapted for guiding the filter insert along a path, which has an axial component and a circumferential component relative to the filter housing, Preferably, the path is continuous in both the axial and circumferential direction. Preferably, the path is helical. The guiding means may be co-axial in relation to a centre axis direction of the filter insert. The guiding means may be formed by a male-female configuration. Preferably, the guiding means is adapted for guiding the filter insert along a path, which is nonparallel to any fastening means between the lid and the filter housing.

According to one embodiment example, the first guiding means comprises at least one radially extending projection for engagement with an inclined surface provided in the filter housing and/or wherein the first guiding means comprises at least one inclined surface extending in a circumferential direction and an axial direction for receiving a radially extending projection provided in the filter housing. Said projection may also be called an engaging radially protruding nose. The inclined plane and the projection are moved in relation to each other such that they slide along each other.

Preferably, the inclined surface has a certain pitch. According to one example, the inclined surface forms a side surface of a guiding member. According to another example, the inclined surface forms, part of a groove/slot. Preferably, two inclined surfaces forms opposite, parallel sides of the groove/slot, wherein the other guiding means may be adapted to glide along a first of said inclined surfaces during removal of the filter insert from the filter housing and along a second of the inclined surfaces during insertion of the filter insert into the housing.

According to one example, the first guiding means is arranged on an inner and/or outer circumference of the filter insert. In case the filter insert comprises both, said at least one radially extending projection and said at least one inclined surface, one of the first guiding means may be provided on the inner circumference of the filter insert and the other is provided on the outer circumference of the filter insert. Further preferably, the filter insert is hollow, wherein one of the first guiding means is positioned inside of the filter insert.

According to one embodiment example, the first guiding means is adapted to guide the filter insert in a first circumferential direction in relation to the filter housing.

According to one embodiment example, the filter insert comprises a tubular structure and wherein at least a part of the first guiding means forms an integral part of or is rigidly attached to the tubular structure. According to one example, the tubular structure is arranged inside of a hollow filter insert Such a tubular structure may be arranged for enforcing a filter material body against collapsing during operation. Arranging the first guiding means in connection with the tubular structure creates conditions for a space and cost efficient construction. The filter insert may have the shape of a hollow cylinder, wherein the tubular portion may define the interior space in the hollow cylinder.

According to one embodiment example, the filter insert comprises a filter material body and wherein at least a part of the first guiding means is arranged at a circumference of the filter material body. The term "circumference" is defined as a circumferential surface of the filter insert. The circumferential surface may be continuous in a circumferential direction or, as in the example of the folded structure, be non-continuous in the circumferential direction.

The filter material body preferably has a cylindrical shape. The term "cylindrical shape" defines a volume enclosed by two planes perpendicular to an axis extending in an axial direction of the filter insert. The cross section of the cylinder at right angles to the axis is preferably circular forming a right circular cylinder. The filter material body may be hollow-cylindrical and formed by a folded structure. However, the filter material body may be non-cylindrical, for example the volume may not be defined by two planes perpendicular to an axis. The axially limiting portions of the filter material body may be planes, but at least one of them may be non-perpendicular in relation to said axis. Further, at least one of the axially limiting portions of the filter material body may have a shape deviating from a straight plane, such as curved.

According to one embodiment example, the first guiding means is arranged for engaging the corresponding second guiding means of the filter housing for guiding the closing means relative to the aperture. According to one example, the first and second guiding means are arranged for positioning the closing means axially in-line with the aperture during the relative movement of the filter insert to the filter housing during insertion.

According to one embodiment example, an end of the first guiding means adjacent the closing means is positioned axially spaced from the closing means for allowing a linear movement of the filter insert relative to the filter housing for opening and closing, respectively, the aperture via the closing means. Such a linear, axial movement of the filter insert is then performed after the helical guiding movement of the first guiding means during insertion of the filter insert.

According to one embodiment example, the first guiding means and the first actuation means are adapted to control separate movements of the filter insert relative to the filter housing and filter housing lid, respectively in consecutive order after each other during installation and removal, respectively, of the filter insert relative to the filter housing. It may be noted that the filter arrangement may be adapted for an intermediate relative movement of the filter insert between said two consecutive movements controlled by the tint guiding means and the first actuation means.

According to one embodiment example, the first guiding means and the first actuation means are adapted to control separate movements of the filter insert relative to the filter housing and filter housing lid, respectively so that, during installation of the filter insert, the filter insert is first moved by the first guiding means followed by the first actuation means.

According to one embodiment example, the first guiding means and the first actuation means are adapted to control separate movements of the filter insert relative to the filter housing and filter housing lid, respectively in opposite circumferential directions. This design creates conditions for a reliable insertion of the filter insert into the housing.

According to one embodiment example, the filter insert comprises a first connection means for engaging a corresponding second connection means of the filter housing lid for a connection to the filter housing lid.

According to one example, the first connection means is designed for a releasable connection between the filter insert and the filter housing lid for reuse of the lid with a new filter insert after release from a used filter insert.

According to a further example, the first connection means is designed for such a connection to the lid that a service technician may operate solely the lid during removal of a used filter insert, wherein the used filter insert is still connected to and hangs below the lid when the lid is disengaged from the housing. Thus, the service technician does not need to touch the used filter insert, which may be covered with fluid, during removal of the filter insert from the filter housing.

According to a further example, the first connection means is designed to cooperate with the first actuation means for achieving the controlled movement of the filter insert relative to the lid and/or with the first guiding means for achieving the guided movement of the filter insert relative to the housing.

According to a further example, the connection between the filter insert and the filter housing lid creates conditions for a reliable positioning of the filter insert in its operational position inside the filter housing in a time-efficient way by first attaching a new filter insert to the lid and then attaching the lid to the filter housing, wherein the filter insert is allowed to move axially in relation to the filter housing lid during insertion.

For example, the connection means may be formed by male-female portions, wherein the male portion is formed on a radial surface of one of the filter insert and the filter housing lid and the female portion is formed on a radial surface of the other one of the filter insert and the filter housing lid.

According to one embodiment example, the first connection means is arranged to allow a relative circumferential movement between the filter insert and the filter housing lid during the movement of the filter insert controlled by the first actuation means relative to the filter housing lid. According to one example, the first connection means is arranged to allow a relative circumferential movement between the filter insert and the filter housing lid only in one circumferential direction when the first and second connection means are arranged in an engaged state. In other words, the first connection means is arranged to block a relative circumferential movement between the filter insert and the filter housing lid in the opposite circumferential direction when the first and second connection means are arranged in an engaged state.

According to one example, the first connection means is arranged to allow a relative circumferential movement between the filter insert and the filter housing lid in a second circumferential direction opposite the first circumferential direction during the movement of the filter insert relative to the lid in an axial direction of the filter housing for movement of the closing means relative to the aperture.

According to one embodiment example, the first connection means is arranged to allow a relative axial movement between the filter insert and the filter housing lid during the movement of the filter insert controlled by the first actuation means relative to the filter housing lid.

According to one embodiment example, the first connection means is arranged to prevent a relative circumferential movement bet peen the filter insert and the filter housing lid during the movement guided by the first guiding means of the filter insert relative to the filter housing lid.

According to one embodiment example, the first connection means comprises a wall portion with at least one opening for receipt of a projection extending from the lid.

According to one example, said wall portion is tubular and arranged in an interior space in a hollow filter insert. A boundary of the opening defines the possible relative movements of the filter insert relative to the lid. The opening may be formed by a groove or slot with an axial extension and a circumferential extension. One end of the axial portion of the opening faces an end surface of the first end of the filter insert for receipt of a projection of the lid during an axial relative connection movement, while the other end of the axial portion of the opening is in communication with a circumferentially extending portion of the opening. A relative movement between the filter insert and the lid is then performed via a first axial movement, wherein the projection is received in the axial portion, followed by a second, circumferential movement, wherein the projection is received in a distant end of the circumferential portion. Further, the connection means preferably comprises a plurality of circumferentially spaced openings for receipt of corresponding projections extending from the lid. According to one example, the openings are circumferentially uniformly distributed.

According: to one embodiment example, the filter insert has a third guiding means adapted the engagement of a fourth guiding means of the filter housing and wherein the third guiding means is adapted for guiding the filter insert in an axial direction of the filter housing for controlling a relative axial movement between the filter insert and the filter housing lid.

According to one example, the third guiding means is adapted for guiding the filter insert solely in an axial direction of the filter housing. Especially, the third guiding means is adapted for engagement in consecutive order after the first guiding means is released from engagement with the second guiding means during insertion of the filter insert into the filter housing. According to one example, the third guiding means is in communication with one part of the first guiding means for a continuous transition between them during insertion and removal, respectively of the filter insert.

According to one embodiment example, the filter insert is adapted for filtering a fluid for an internal combustion engine.

It is also desirable to provide a filter arrangement, which creates conditions for inserting a new filter insert into the filter housing in a secure way to an operative position.

According to an aspect of the invention, a filter arrangement is provided comprising a filter insert according to above and further comprising a filter housing lid, which is adapted for closing a filter insert access end of the filter housing, wherein the lid comprises the second actuation means for contacting the first actuation means at the first end of the filter insert so for controlling a relative axial movement between the filter insert and the filter housing lid.

Preferably, at least one of the second actuation means of the lid and the first actuation means of the filter insert has a varying extension in a center axis direction of the lid and/or an axial direction of the filter insert along a circumferential direction for actuation of the first actuation means during a turning movement of the lid relative to the filter housing for engagement of the lid with the filter housing. The center axis of the lid preferably coincides with a rotational axis of the lid.

According to one example, the filter insert is guided via the actuation means during engagement of the lid with the filter housing via separate fastening means.

According to one embodiment example, at least one of the first and second actuation means has a varying extension in a center axis direction of the lid and/or an axial direction of the filter insert along a circumferential direction for controlling an axial movement of the filter insert during a turning movement of the lid.

According to one embodiment example, the lid comprises a plate shaped member and wherein the second actuation means comprises at least one projection extending from the plate shaped member in the direction of a center axis of the lid and wherein the projection forms a ramp in the circumferential direction of the lid. The center axis of the lid preferably coincides with a rotational axis of the lid.

According to one embodiment example, the filter housing lid comprises a first fastening means for fastening to a corresponding second fastening means of the filter housing and that the first fastening means is separate from the second actuation means.

According to one embodiment example, the first fastening means is provided at an external peripheral edge of the lid.

According to one embodiment example, the first fastening means is adapted for movement of the lid relative to the filter housing in two consecutive steps, namely a first axial movement and a second circumferential movement, during installation.

According to one embodiment example, the first fastening means forms part of a key-lock structure for fitting with a corresponding shaped part of the filter housing during a movement of the filter lid towards the filter housing. Preferably, the key-lock structure is adapted for allowing and/or guiding a linear movement of the filter lid towards the filter housing. Further preferably, the key-lock structure is adapted for allowing a movement of the filter lid towards the filter housing along the longitudinal axis of the filter housing so that the center axis of the lid coincides with the longitudinal axis of the filter housing. The plate shaped member of the lid is discontinuous at its peripheral edge in a circumferential direction of the lid for allowing a relative axial movement of the plate shaped member past a radially inwards projecting element of the filter housing.

According to one embodiment example, the lid comprises a handle at an opposite side of the lid relative to the second actuation means. The handle may be used to provide a turning torque to fasten the lid to the filter housing.

According to one embodiment example, the filter arrangement further comprising a filter housing with an access opening for receipt of the filter insert and wherein the filter housing lid is arranged for opening and closing, respectively, the filter insert access opening.

According to one embodiment example, the filter housing, comprises means forming part of a key-lock structure for fitting with a complimentary shaped plate shaped member of the lid during a movement of the lid relative to the filter housing. Preferably, the key-lock structure is adapted for allowing a linear movement of the filter lid towards the filter housing.

According to one embodiment example, the filter housing comprises the second fastening means and wherein the first and second fastening means are arranged in such a way in relation to the first and second actuation means that the movement of the filter insert relative to the lid controlled by the first and second actuation means is actuated when the lid is fastened and released, respectively relative to the filter housing via the first and second fastening means.

According to one embodiment example, the filter housing comprises an aperture in bottom region of the filter housing. The aperture is complimentary shaped to the closing means of the filter insert for achieving closing and opening, respectively of the aperture. The aperture may be in communication with a sump, wherein the filter housing may be drained from residual oil when the closing means is withdrawn from the aperture. According to one example, the aperture is eccentrically positioned in the bottom region of the filter housing.

According to one embodiment example, the filter housing comprises the second guiding means for engagement of a first guiding means of the filter insert for guiding the filter insert relative to the filter housing.

According to one embodiment example, the filter housing comprises the fourth guiding means for engagement of a third guiding means of the filter insert for guiding the filter insert relative to the filter housing and wherein the third and fourth guiding means are adapted for guiding the filter insert in an axial direction of the filter housing during the engagement of the first and second actuation means for controlling the relative axial movement between the filter insert and the filter housing lid.

According to further aspect, the invention regards an internal combustion engine system comprising an internal combustion engine and a filter arrangement according to above operatively connected to the internal combustion engine for cleaning a fluid for the internal combustion engine.

Further advantages and advantageous features of the invention are disclosed in the following description and in the further dependent claims.

BRIEF DESCRIPTION OF THE DRAWINGS

With reference to the appended drawings, below inflows a more detailed description of embodiments of the invention cited as examples.

In the drawings.

DETAILED DESCRIPTION

Figure 1:
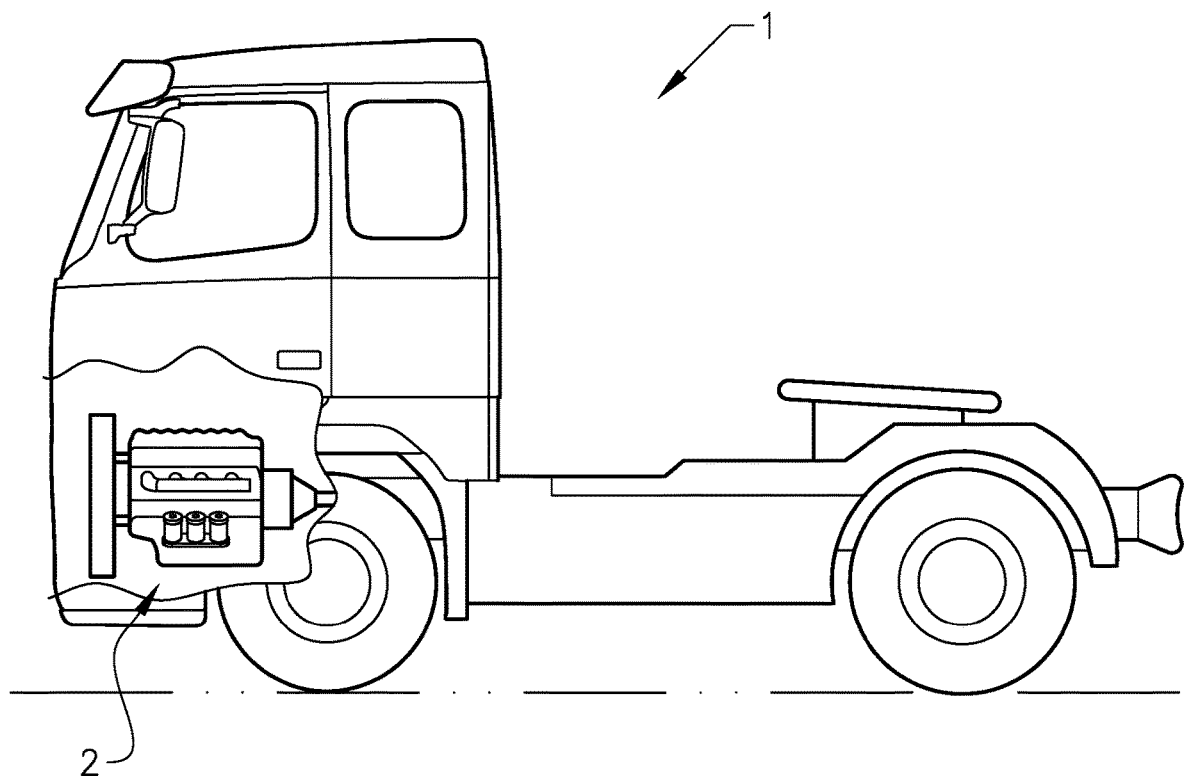
FIG. 1 discloses a vehicle in the form of a truck in a side view.

FIG. 1 discloses a vehicle in the form of a truck 1 in a partly cut side view. Further, an internal combustion engine (ICE) in the form of a diesel engine 2 for propelling the truck is indicated.

Figure 2:
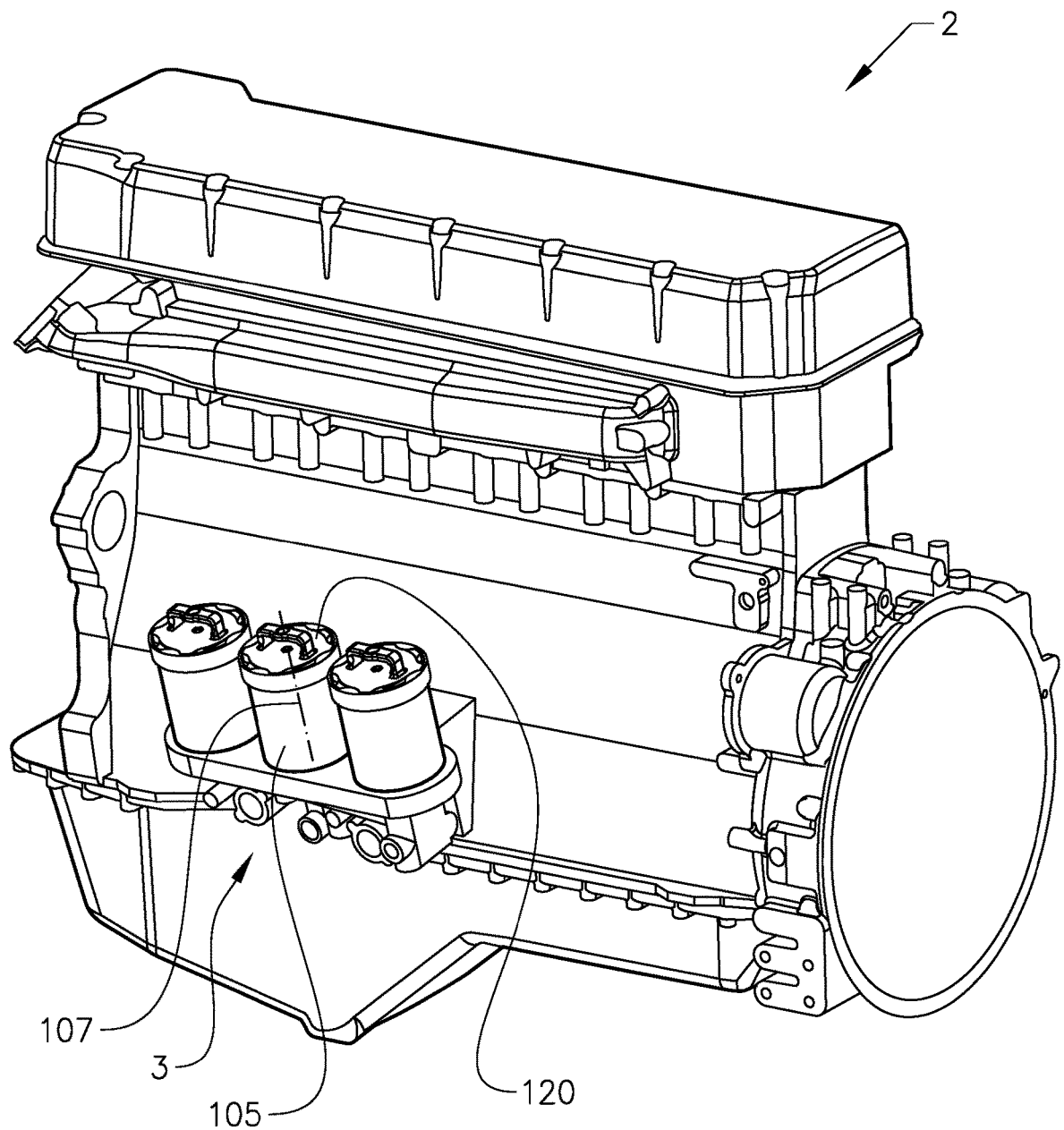
FIG. 2 discloses an internal combustion engine of the truck in a perspective view with a filter arrangement attached, FIG. 3 discloses the filter arrangement of FIG. 2 in a partly assembled state.

FIG. 2 shows the ICE 2 provided with a filter arrangement 3 according to a first embodiment example of the invention. The filter arrangement 3 is adapted for filtering a fluid for the ICE. More specifically, there are three identical filter arrangements 3 arranged in parallel with each other. The filter arrangement 3 comprises a filter housing 105, which is non-removably attached to the ICE. The filter arrangement 3 is in an upright, standing position slightly inclined outwards from its attachment at the bottom relative to a side of the ICE. A lower section of the filter arrangement 3 comprises inlets and outlets, which will be explained later. The filter housing 105 is in the form of a cup-shaped part, which is rigidly attached to the lower section. The filter housing 105 defines a longitudinal axis 107 along which a filter insert (not shown) can be inserted into the filter housing and removed from the filter housing via an upper access opening. The filter arrangement 3 further comprises a lid 120 for closing the filter insert opening of the filter housing.

Figure 3:
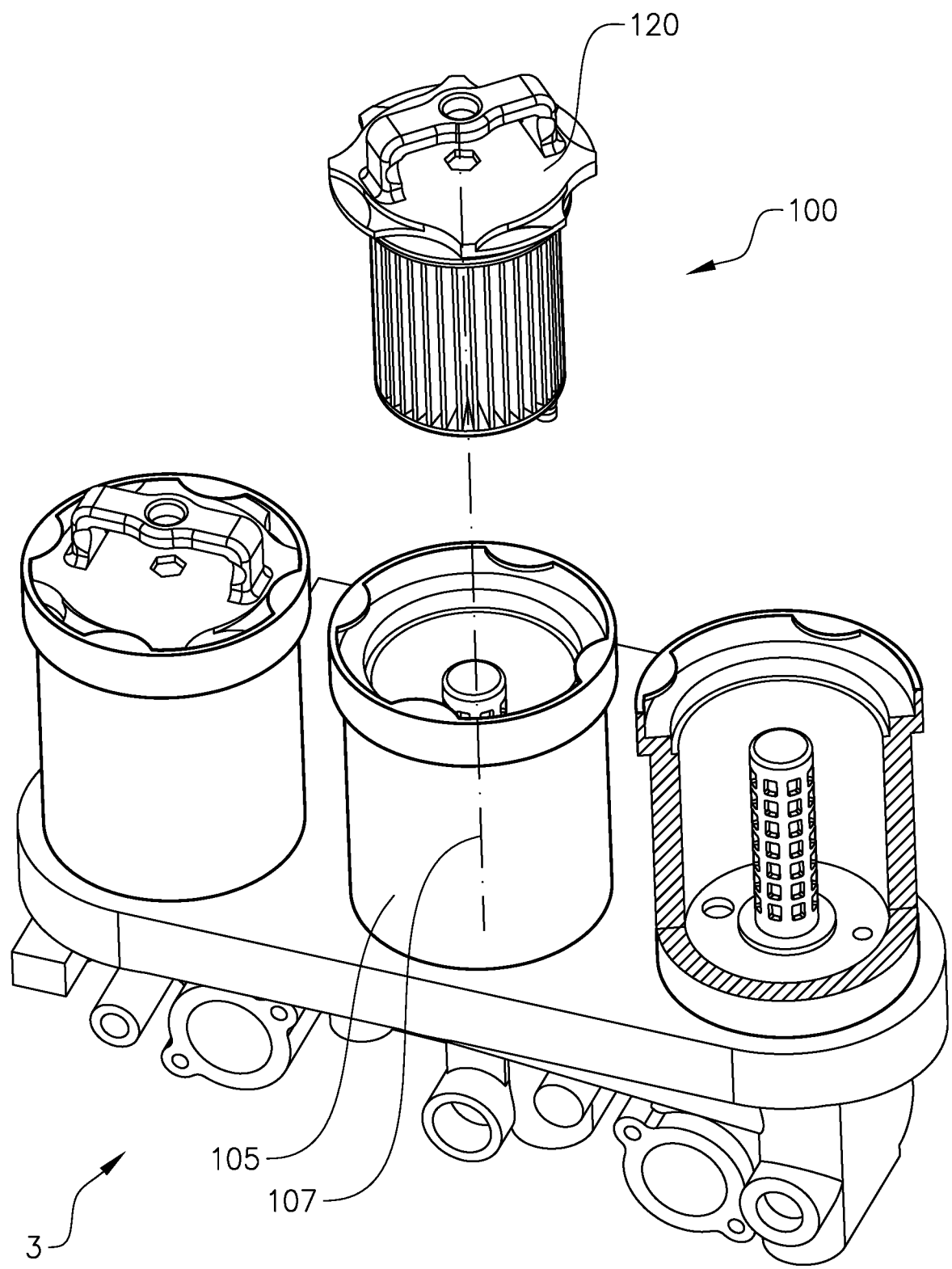

FIG. 3 discloses the filter arrangement 3 of FIG. 2 in a partly assembled state. A filter insert 100 according: to a first embodiment example is attached to the lid 120 for being inserted into the filter housing 105.

Figure 4:
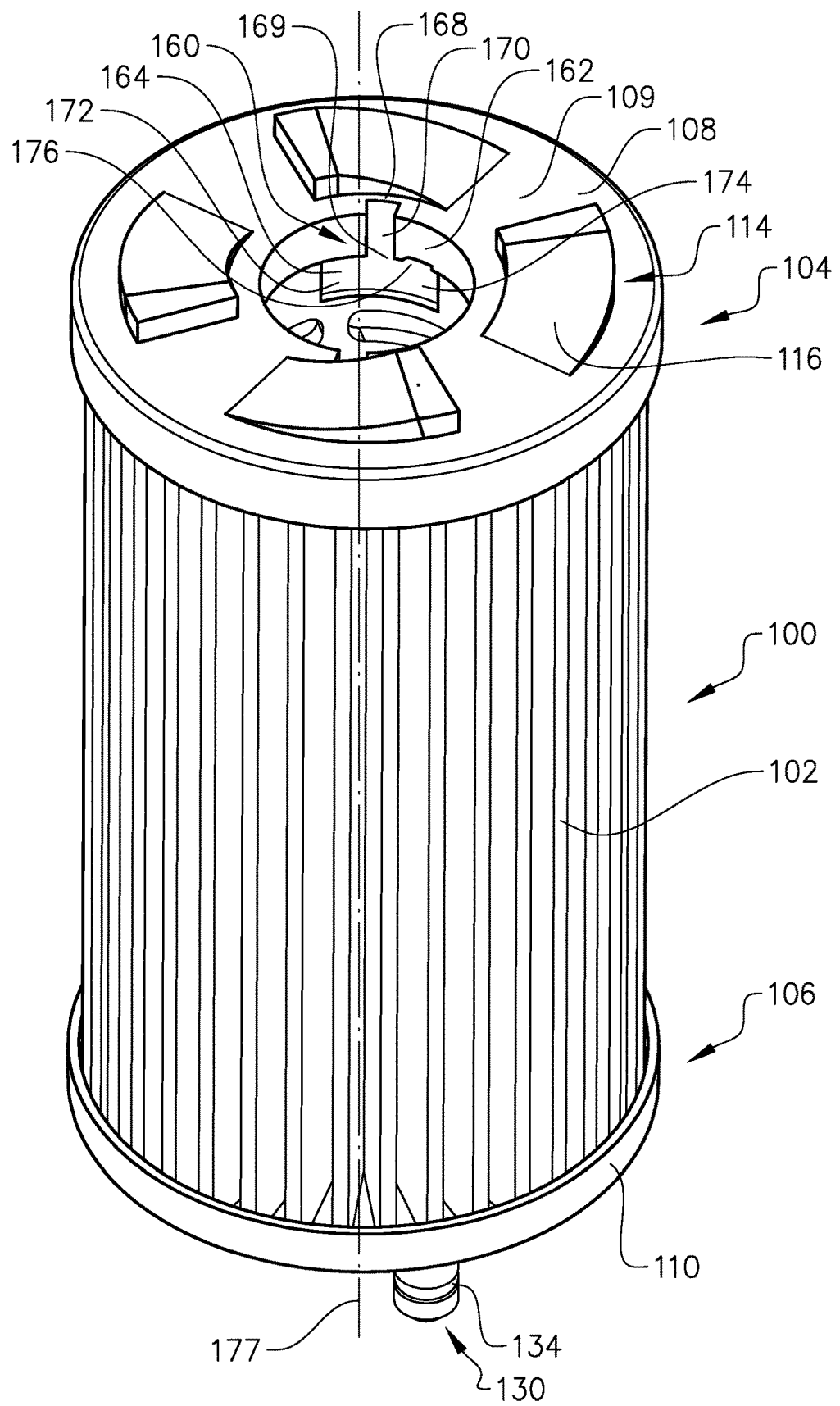
FIG. 4 is a perspective view from the top of a filter insert according to a first embodiment example.
Figure 5:
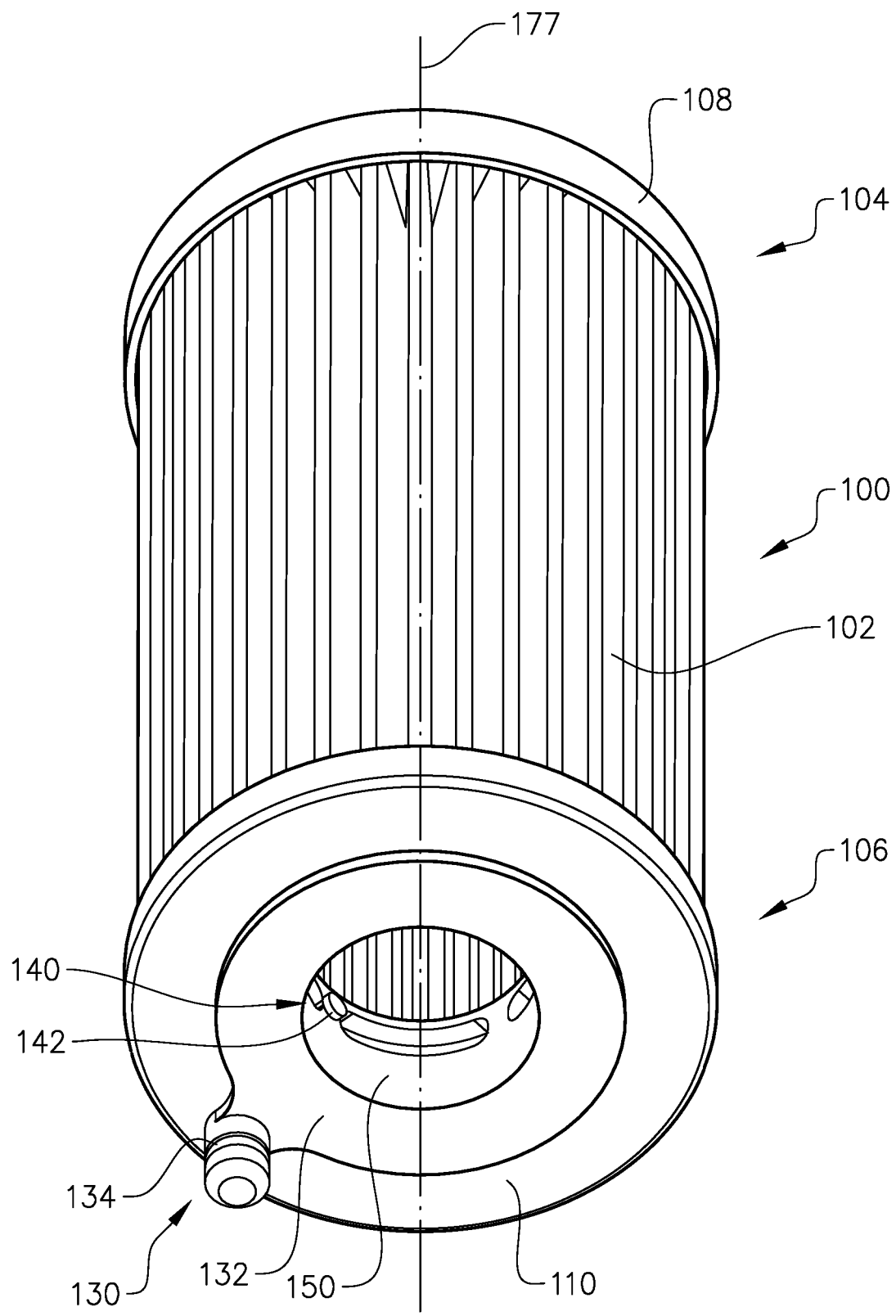
FIG. 5 is a perspective view from below of the filter insert according to the first embodiment example.
Figure 6:
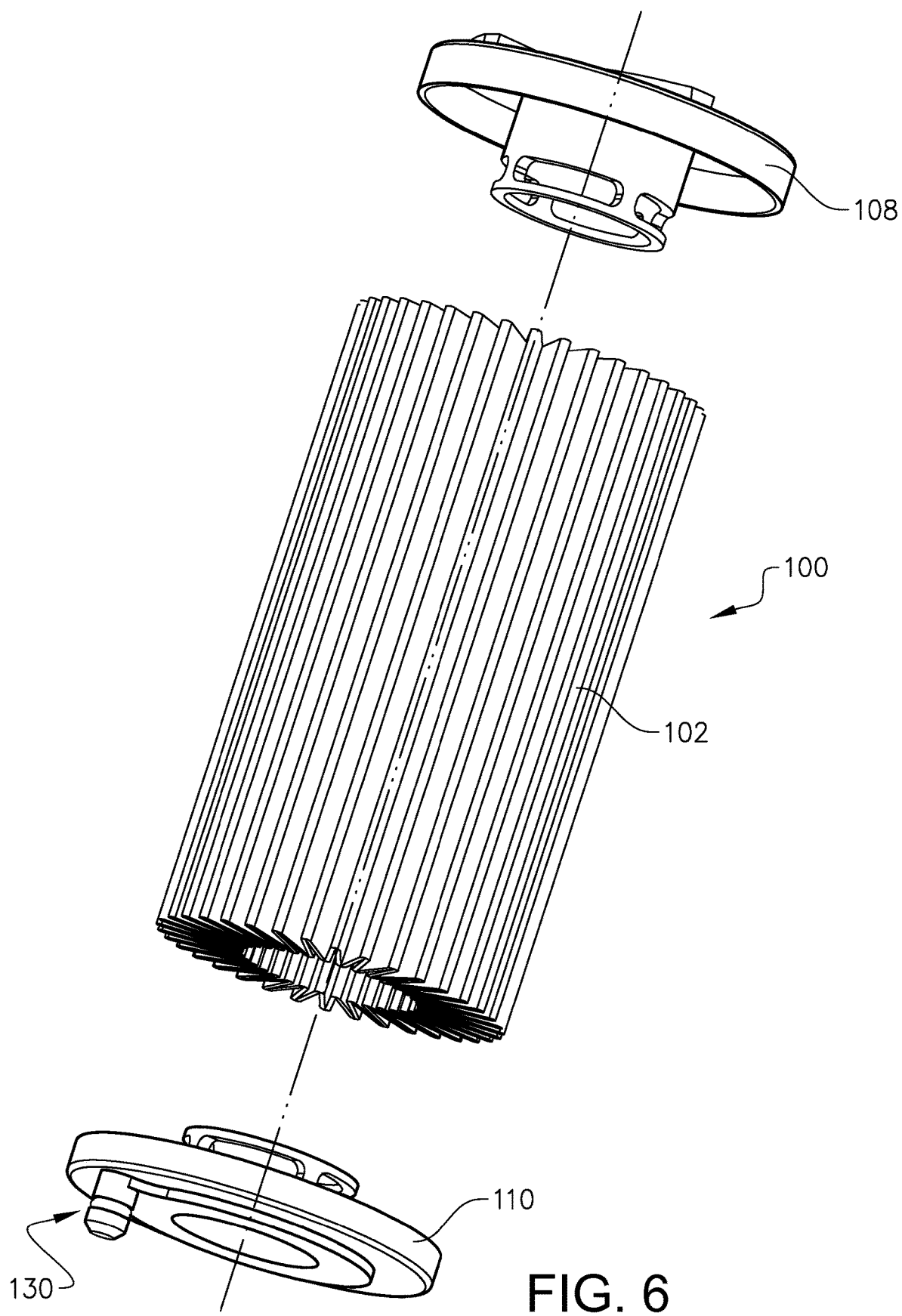
FIG. 6 is an exploded perspective view of the filter insert according to the first embodiment example.

FIGS. 4-6 show the filter insert 100 according to a first embodiment example for being removably arranged in the filter housing 105. The filter insert 100 comprises a filter material body 102. The filter material body 102 has a hollow circular cylindrical shape. Thus, the filter material body 102 has an external cross sectional shape generally defining a circle. Further, the filter material body 102 has an internal cross sectional shape generally defining a circle. Further, the filter material body 102 is formed by a folded structure.

More specifically, the filter material body 102 is formed by an elongated, sheet of paper (strip), which has been, folded successively back and forth and configured to assume the cylindrical shape, for example via rolling. The cylindrical filter material body 102 has its axis parallel to the line of the folds.

The filter insert 100 further comprises a first end 104 and a second end 106 at opposite sides of the filter material body in the direction of a centre axis 177 of the filter insert 100. A first end panel 108 is arranged at the first end 104 and a second end panel 110 is arranged at the second end 106. The end panels 108, 110 have a main extension in a radial direction of the filter insert. Each of the end panels 108, 110 has a plate shaped structure extending in a plane perpendicular to the axial direction of the filter insert. The filter material body 102 is delimited on the top by the upper panel 108 and on the bottom by the lower panel 110. The panels 108, 110 may be formed by separate parts attached to the filter material body 102. The filter material body 102 is then bonded to the upper panel 108 and the lower panel 110 at the edges of the filter paper in the axial direction of the filter insert. The panels 108, 110 may be made of plastics and the filter material body 102 is connected to the panels by non-contact infrared bonding or other bonding processes, such as hot-plate bonding. Alternatively, the panels 108, 110 are formed by glue or other fastening fluid attached to the edges of the filter material body 102 in the axial direction of the filter insert and then solidified.

The filter insert 100 comprises a first actuation means 114 positioned at the first end 104 of the filter insert. The first actuation means 114 is adapted for being actuated by a corresponding second actuation means 115 of the filter housing lid 120, see FIG. 8, for controlling a relative axial movement between the filter insert 100 and the filter housing lid 120. The first actuation means 114 is adapted for controlling a relative circumferential movement between the filter insert 100 and the filter housing lid 120 simultaneously with the relative axial movement between the filter insert and the filter housing lid. More specifically, the first actuation means 114 is adapted for transferring a turning movement of the filter housing lid 120 to a linear movement of the filter insert. The first actuation means 114 comprises an external contact surface 116 defining a projection. The projection 116 forms part of a structure with varying extension in an axial direction of the filter insert 100 along a circumferential direction of the filter insert. More specifically, the actuation means 114 comprises at least one ramp extending in a circumferential direction of the filter insert from a position flush with a flat external surface of the first end panel to an axially elevated end position. More specifically, the actuation means 114 comprises a plurality of circumferentially spaced ramps. The ramps are uniformly distributed in the circumferential direction. The actuation means 114 is eccentrically positioned at the first end 104 of the filter insert with regard to the centre axis 177 of the filter insert. Further, the actuation means 114 forms an integral part of the first end panel.

Figure 9:
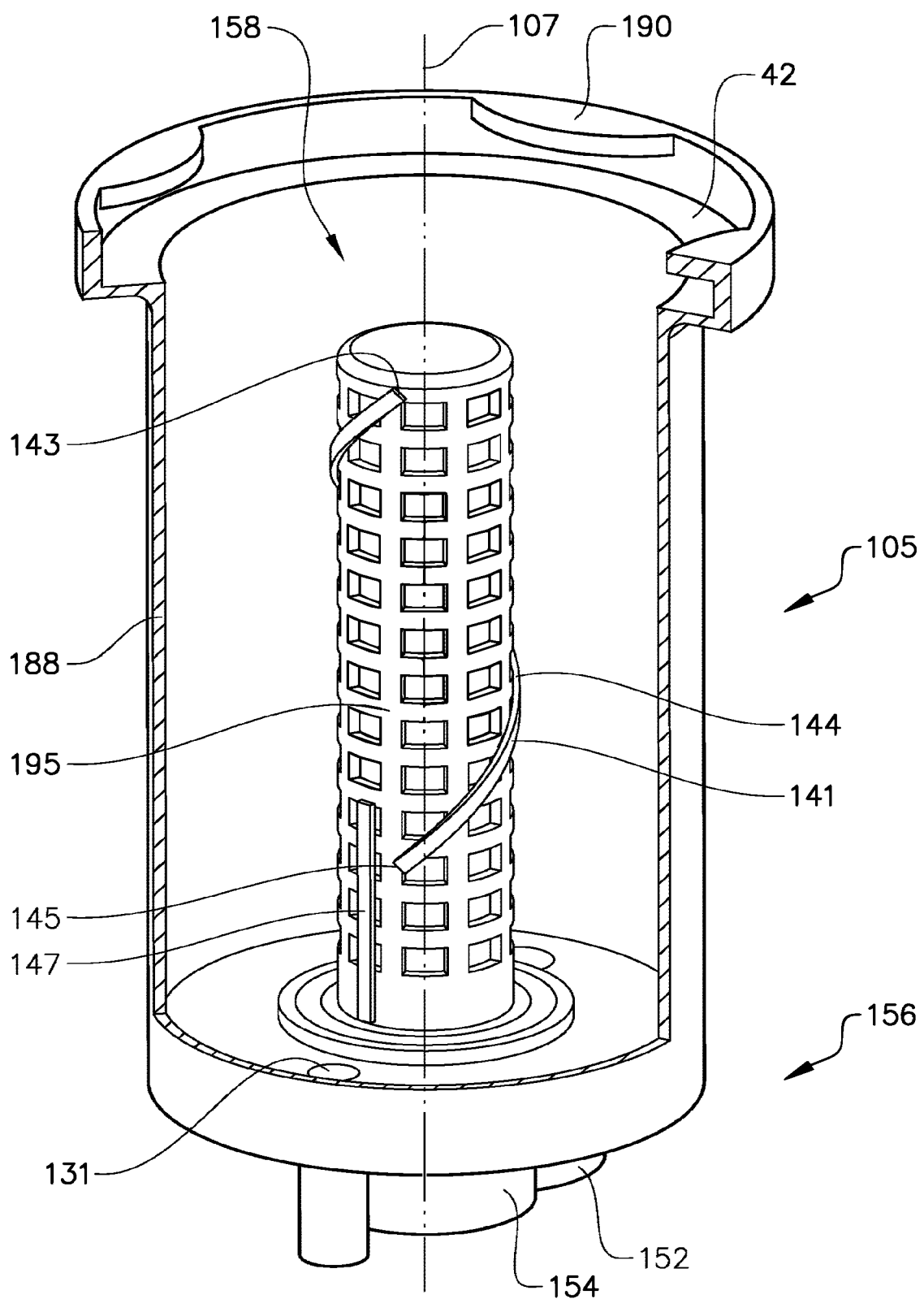

Further, the filter insert 100 comprises a closing means 130, or blocking element, positioned at the second end 106 of the filter insert for controlling opening and closing, respectively, of an aperture 131 in a bottom region of the filter housing, see FIG. 9. The closing means 130 is formed by a body arranged to sealingly engage the aperture 131. The body has a circular cross sectional shape. Further a sealing ring 134 is arranged around the body. The closing means 130 forms an integral part of the second end panel 106. The closing means 130 is arranged to project in an axial direction of the filter insert from a main portion 132 of the second end panel 110. The closing means 130 has a tapered free end for engaging the internal wall of the aperture for guiding the closing means during insertion. The aperture 131 has a centre axis in parallel with the longitudinal axis 107 of the filter housing 105, wherein the filter insert 100 is adapted to be moved in parallel with the longitudinal axis 107 of the filter housing for moving the closing means 130 into the aperture 131 towards its operative position in the aperture 131.

The first actuation means 114 is adapted for transferring a turning movement of the filter housing lid 120 to a linear movement for closing and opening respectively, the aperture via the closing means 130.

Further, the filter insert 100 comprises a first guiding means 140 arranged for engaging a corresponding second guiding means 141 of the filter housing 105, see FIG. 9, for guiding the filter insert 100 relative to the filter housing 105 along a path, which has an axial component and a circumferential component relative to the filter housing. The first guiding means 140 comprises at least one radially extending projection 142 for engagement with an inclined upper surface 144 of the second guiding means 141. The second guiding means 141 is formed by an elongated guiding member extending from a first axial position 143 to a second axial position 145, which is axially spaced from the first axial position. The second guiding means 141 is adapted for securing that the radial project 142 ends up on the upper surface 144 somewhere along the longitudinal extension of the second guiding means 141 during an axial insertion of the filter insert 100 irrespective of the relative circumferential starting position of the filter insert 100 and the housing 105. More specifically, the second guiding means 141 is continuously curved between the first axial position 143 and the second axial position 145. More specifically, the second guiding means 141 has a helical shape. More specifically, the second guiding means 141 has a circumferential extension of at least one complete turn, i.e. at least 360 degrees. The projection 142 extends radially inwards from an inner circumference of the filter insert 100. During insertion of the filter insert 100 into the filter housing 105, the filter insert may be moved axially, wherein the fitter insert centre axis 177 coincides with the longitudinal centre axis 107 of the filter housing 105, wherein the radial projection 142 will strike the second guiding means 141 between the first axial end 143 and the second axial end 145. The radial projection 142 will glide on the inclined surface 144 of the guiding means 141 during the consecutive movement of the filter insert 100 towards its operative position in the housing 105, wherein the filter insert 100 will be turned relative to the filter housing 105.

The filter insert 100 comprises a tubular structure 150, which forms an integral part of the second end panel 110 and projects into the internal space of the hollow filter material body 102. The projection 142 forms an integral part of the tubular structure 150. The first guiding means 140 is arranged for engaging the corresponding second guiding means 141 of the filter housing for guiding the closing means 130 relative to the aperture 131 and more specifically to a circumferential position axially in-line with the aperture. The radially extending projection 142 is positioned axially spaced from the closing means 130 for allowing a linear movement of the filter insert relative to the filter housing for opening and closing, respectively, the aperture 131 via the closing means 130 after the closing means 130 has been brought to an intermediate position axially with the aperture 131.

The first guiding means 140 and the first actuation means 114 are adapted to control separate movements of the filter insert 100 relative to the filter housing 105 and filter housing lid 120, respectively in consecutive order after each other during installation and removal, respectively, of the filter insert relative to the filter housing and more specifically so that during installation of the filter insert, the filter insert is first guided by the first guiding means 140 followed by the first actuation means 114. The first guiding means 140 and the first actuation means 114 are adapted to control separate movements of the filter insert relative to the filter housing 105 and filter housing lid 120, respectively in opposite circumferential directions. In other words, the filter insert 100 is first turned in a first circumferential direction during guiding of the guiding means 140, 141 followed by turning in the opposite circumferential direction during control by the actuation means 114, 115.

The filter insert 100 comprises a first connection means 160 for engaging a corresponding second connection means 161 of die filter housing lid 120 for a connection to the filter housing lid. The first connection means 160 comprises a wall portion 162 with at least one opening 164 for receipt of a projection 165 extending from the lid. More specifically, the wall portion 162 has a tubular shape and is arranged inside of the filter material body 102. The tubular wall portion 162 is formed in a one-piece unit with the upper panel 108.

The first connection means 160 is arranged to allow a relative circumferential movement between the filter insert 100 and the filter housing lid 120 during the movement of the filter insert controlled by the first actuation means 114 relative to the filter housing lid 120. More specifically, the opening 164 has a circumferential extension, which is greater than a circumferential extension of an end portion 167 of the projection 165.

Figure 11:
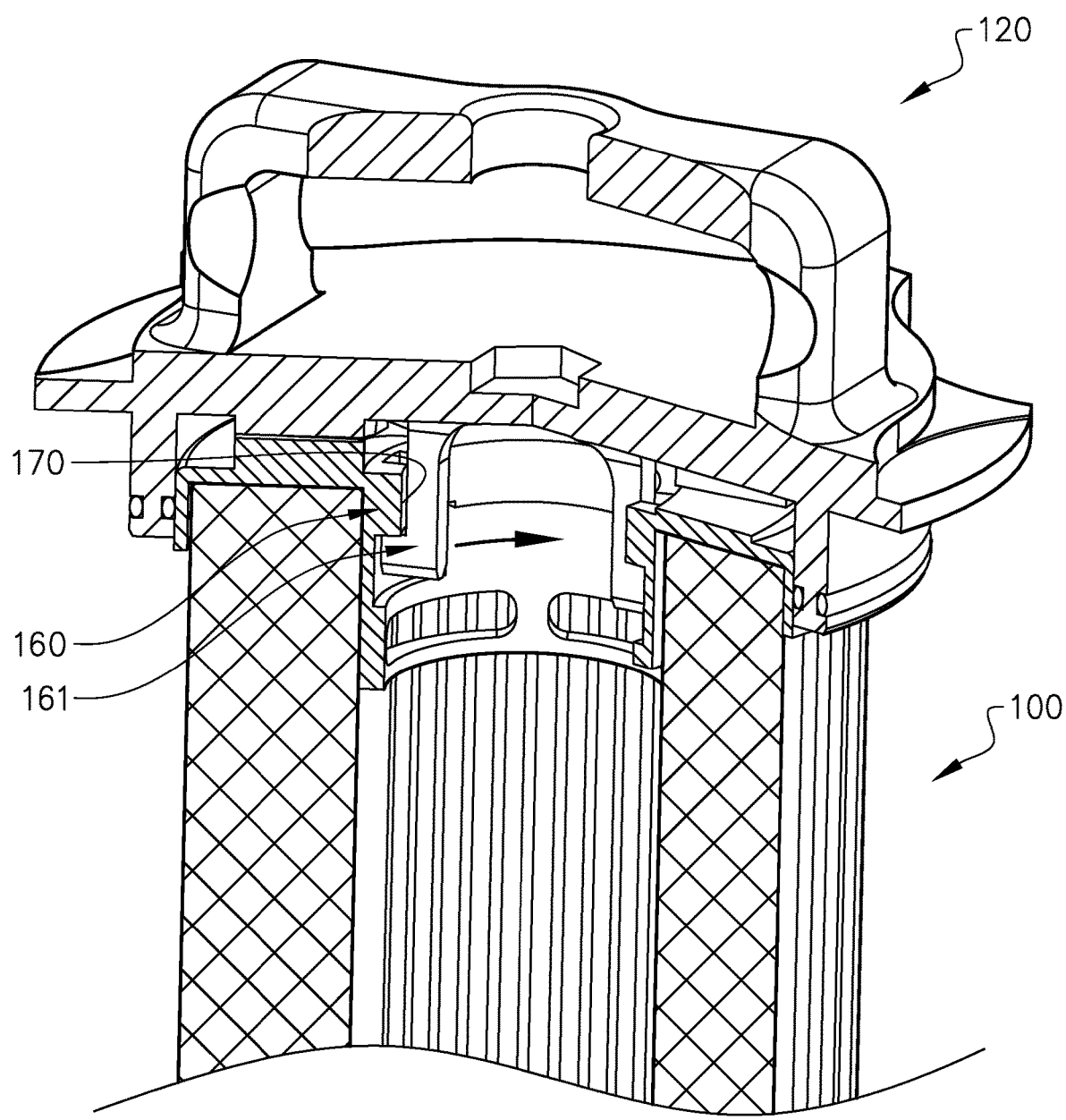

The first connection means 160 is arranged to allow a relative axial movement between the filter insert and the filter housing lid during the movement of the filter insert controlled by the first actuation means 114 relative to the filter housing lid 120. More specifically, the opening 164 has an axial extension, which is greater than an axial extension of the end portion 167 of the projection 165. FIG. 11 discloses a state where the lid 120 has been moved axially relative to the filter insert 100, wherein the projection 165 is received in an axial portion 170 of the opening 164, to an intermediate position.

Figure 12:
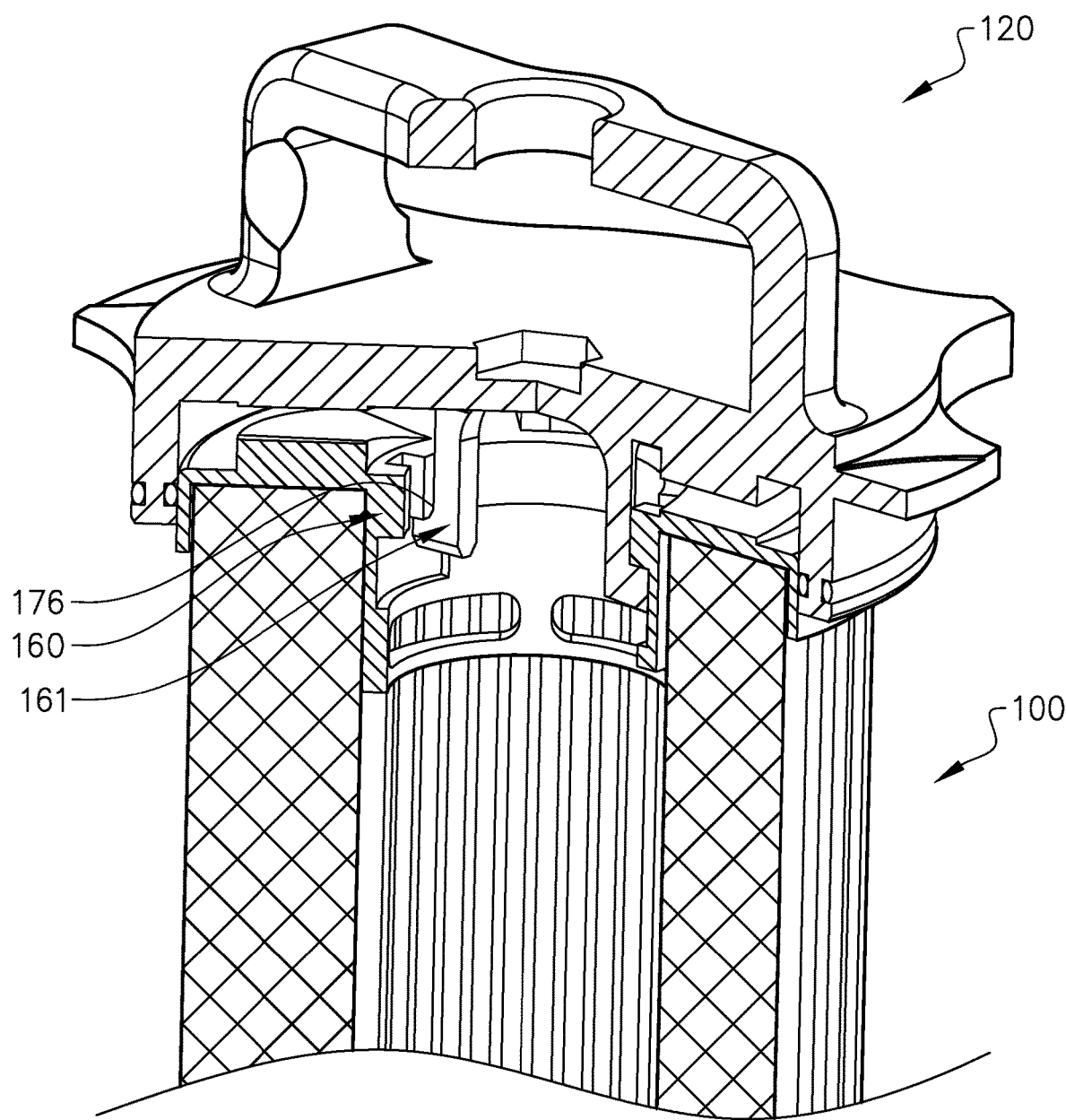

A boundary of the opening. 164 defines the possible relative movements of the filter insert 100 relative to the lid 120. The opening 164 is formed by a groove with an axial extension and a circumferential extension. One end 168 of the axial portion 170 of the opening faces an end surface 109 of the first end 104 of the filter insert for receipt of the projection 165 of the lid during an axial relative connection movement, while the other end 169 of the axial portion 170 of the opening is in communication with a circumferentially extending portion 172 of the opening. A relative movement between the filter insert 100 and the lid 120 is then performed via a first axial movement, wherein the projection 165 is received in the axial portion 170, followed by a second, circumferential movement, wherein the projection 165 is received in a distant end 174 of the circumferential portion 172. The axial portion 170 defines a seat 176 at the distant end 174 for the end portion 167 of the projection 165. The seat 176 is adapted for providing a certain resistance against release of the projection. FIG. 12 discloses a state where the lid 120 has been moved circumferentially relative to the filter insert 100 from the intermediate position shown in FIG. 11 to a final position, wherein the projection 165 is received in the seat 176. A wall portion defining the seat in the circumferential direction blocks any further relative circumferential movement of the lid past the seat. The lid 120 and the filter insert 100 are now interconnected and may now be introduced into the housing 105.

Further, the first connection means 160 is arranged to prevent a relative circumferential movement between the falter insert 100 and the filter housing lid 120 during the movement guided by the first guiding means 140 of the filter insert relative to the filter housing lid. This is accomplished via the design of the seat 176 and the complimentary shaped projection 165.

Thus, the first connection means 160 is arranged to achieve a connection between the filter insert 100 and the lid 120 in such a manner that the lid 120 can be gripped and lifted from the filter housing 105 while the used filter insert is moved in unison with the lid during a removal of the used filter insert. The lid 120 can then be detached from the used filter insert 100 by a quick turning movement (a flick), which overcomes the resistance against release of the projection 165 as mentioned above.

Further, the filter housing 105 comprises a fourth guiding means 147 for guiding the filter insert 100 axially during the movement of the closing means 130 into the aperture 131. The axial guiding means 147 comprises an elongated, straight guide member, which extends in an axial direction in parallel with the centre axis 107 of the filter housing 105. The axial guiding means 147 forms an overlap with the second, helical, guiding means 141 in the axial direction and is circumferentially spaced from the lower end position 145 so that the radial projection 142 will glide along a side wall of the axial guiding means 147 after having left the second, helical, guiding means 141 during insertion. On the other hand, during removal of a used filter insert 100, the filter insert may be pulled straight up in an axial direction from its operative position, wherein the radial projection 142 will pass the gap between the axial guiding means 147 and the second, helical guiding means 141.

Figure 7:
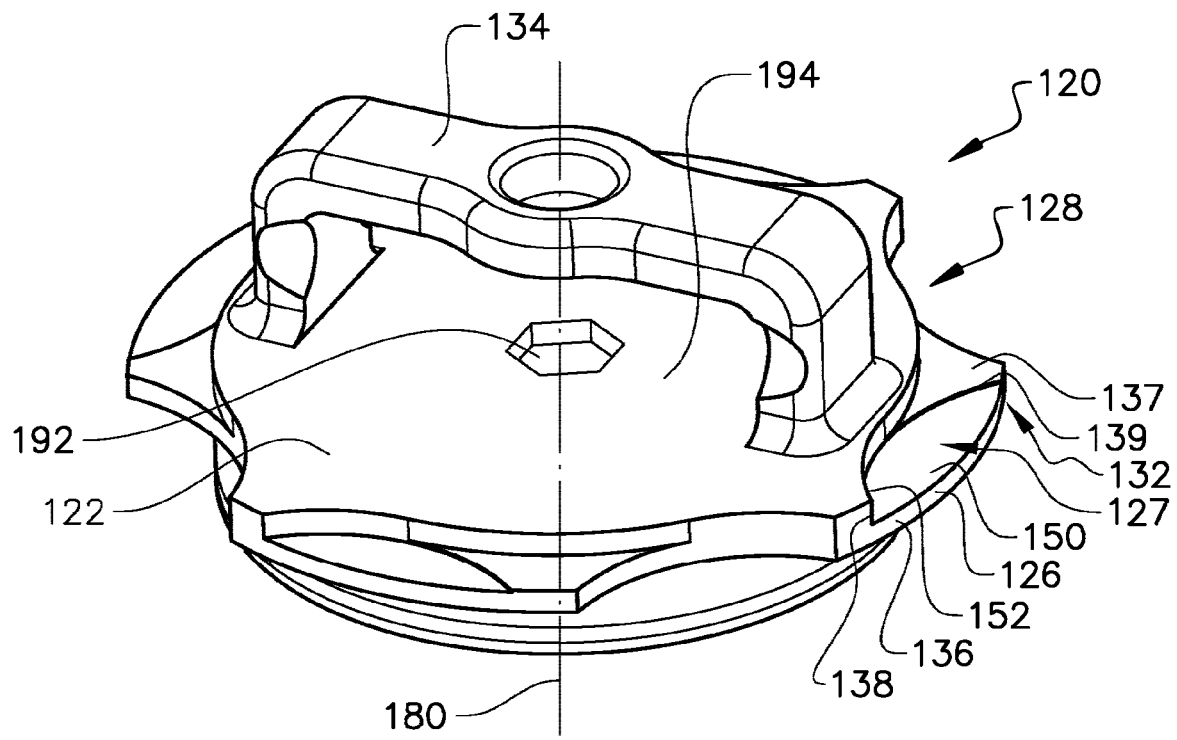
FIG. 7 is a perspective view from the top of a lid according to a first embodiment example.
Figure 8:
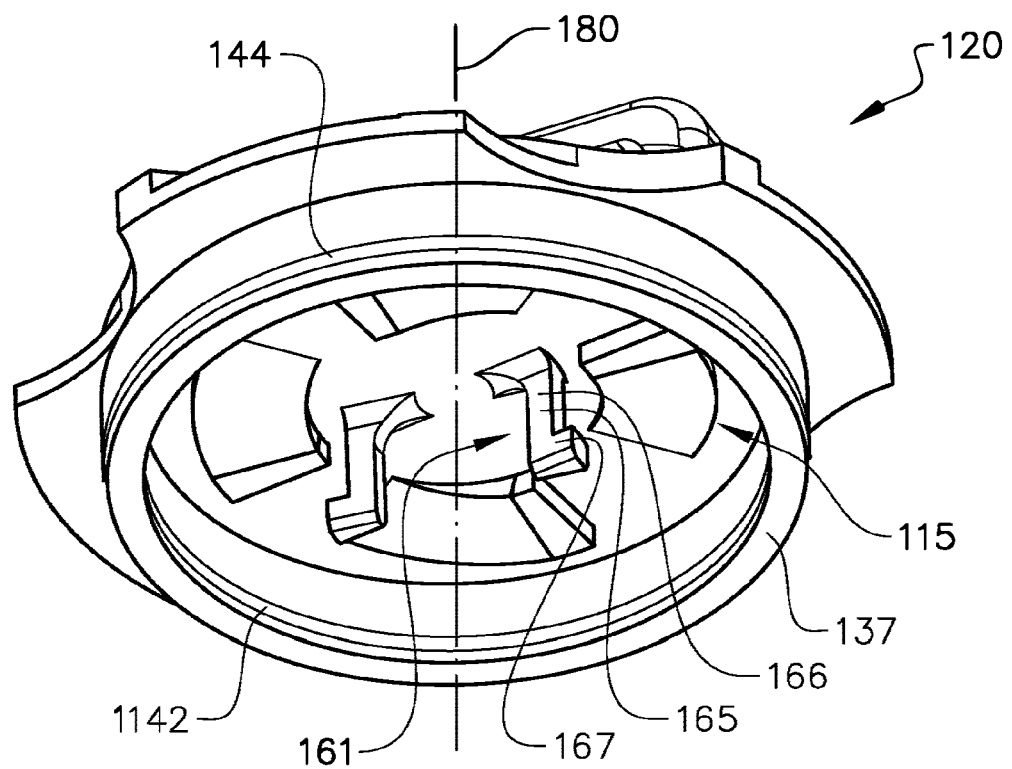
FIG. 8 is a perspective view from below of the lid according to the first embodiment example, FIG. 9 discloses a filter housing according to a first embodiment example.

FIGS. 7-8 shows the lid 120 according to a first embodiment example for being removably attached to the filter housing 105. The lid 120 comprises a plate shaped portion 122, the second connection means 161 projecting from a first, lower side of the plate shaped portion 122, for attachment to the first connection means 160 of the filter insert 100, and the second actuation means 115 also arranged on the first, lower side of the plate shaped portion 122 for engagement with the first actuation means 114 of the filter insert 100. The plate shaped portion 122, second connection means 161 and second actuation means 115 are formed in a one-piece unit. The second connection means 161 comprises a plurality of circumferentially spaced axial projections, or fingers, 165. More specifically, axial projections, or fingers, 165 are uniformly distributed in the circumferential direction. More specifically, the second connection, means 161 comprises two axial projections, or fingers, 165, which are positioned opposite each other. Each axial projection 165 forms a hook and comprises a first, substantially straight portion 166, extending in parallel with an axis 180 of the lid 120 and a second radially projecting portion 167 extending from a free end of the straight portion. The projections 165 are relatively rigid.

Further, the lid 120 comprises an annular collar, or wall, 137 projecting axially from the plate shaped portion 122 and encompassing the second actuation means 115 and the second connection means 161. The collar 137 is formed in a one-piece unit with the plate shaped portion 122. The lid 120 further comprises scaling means 1142, 144, in the form of sealing rings, on opposite sides of the collar 137 for sealingly engage a contact surface of the filter insert 100 and the filter housing 105, respectively, in order to separate a raw side from a clean side of the filtering arrangement.

An external peripheral edge 126 of the plate shaped member 122 forms part of a key-lock structure for fitting with a complimentary shaped part of the filter housing 105 during a movement of the filter lid 120 towards the filter housing 105. The key-lock structure is adapted for a first linear movement of the filter lid 120 towards the filter housing 105. More specifically, the key-lock structure is adapted for allowing a movement of the filter lid 120 towards the filter housing 105 along the longitudinal axis 107 of the filter housing so that the center axis 180 of the lid coincides with the longitudinal axis 107 of the filter housing in a certain relative circumferential position. The plate shaped member 122 of the lip 120 is discontinuous at its peripheral edge 126 in a circumferential direction of the lid for allowing a relative axial movement of the plate shaped member 122 past a radially inwards projecting element 190 of the filter housing 105. More specifically, the plate, shaped member 122 forms a passage 128 at its peripheral edge 126 for the radially inwards projecting element 190.

The plate shaped member 122 comprises a seat 127 at a second, upper side 194 of the plate shaped member for receipt of the radially inwards projecting element 190 of the corresponding key-lock structure of the filter housing. The seat 127 is defined by a bottom surface 150 facing in a center axis direction of the lid 120 and a side wall 152 forming a boundary for the bottom surface and extending substantially in parallel with the center axis direction of the lid. The seat 127 has the shape of an arc in a cross section perpendicular to the center axis direction of the lid.

The passage 128 is circumferentially spaced from the seat 127. The passage 128 is configured for guiding the plate shaped member 122 relative to the projecting element 190 during the relative axial movement of the plate shaped member past the projecting element 190. The passage 128 has the shape of an arc in a cross section perpendicular to the center axis direction of the lid. The passage 128 has a shape complimentary to the seat 127 and especially the same cross section with regard to shape and size. The plate shaped member 122 comprises a plurality of circumferentially spaced pairs of seat and, passage.

The plate shaped member 122 comprises a first portion 136 for being positioned behind the projecting element 190 in a connected, operational position of the lid, after the turning movement for blocking a withdrawal of the plate shaped member along a center axis of the lid. Further, the plate shaped member 122 comprises a stop means 138 for stopping further relative turning movement of the plate shaped member when the first portion has reached its intended position behind the radially projecting element 190. A bottom surface of the seat 127 is recessed and wherein the stop means 138 is formed by a first side wall portion of the seat at an opposite side of the seat relative to the passage.

The plate shaped member 122 comprises a guiding glide surface 137 for the projecting member 190 on its second side 194 between the passage 128 and the seat 127. The guiding surface 137 faces in the center axis direction of the lid. The projecting member guiding surface 137 forms a crest 139. Further preferably, the crest 139 is positioned closer to the seat 127 than the passage 128. Further preferably, the crest 139 is defined by a side wall of the seat. The projecting member guiding surface 137 between the passage 128 and the crest 139 has an inclination angle of less than 10 degrees and preferably more than 2 degrees and especially more than 5 degrees with regard to a plane perpendicular to the center axis of the lid.

A portion 132 of the plate shaped member 122 between the axial passage 128 and the seat 127 is arranged to be wedged between the projecting element 190 and an axially opposite, circumferentially continuous surface 42 of the filter housing, see FIG. 9, during the turning movement of the lid 120 thereby creating a resistance to a turning movement.

The lid 120 comprises a handle 134 at the second side 194 of the lid for manual operation of the lid by a service technician. The handle 134 is formed in a one-piece unit with the plate shaped member 122. During insertion of a new filter insert 100, the lid will experience a turning movement during the part of the insertion movement where the filter insert 100 is guided by the helical second guiding means 141. Depending on the initial circumferential position of the lid 120 and the filter insert 100, a service technician may need to release a grip of the handle and take new grip on the other side of the handle for continuing the turning movement. This may be needed when the radial projection 142 hits the helical second guiding means 141 at a position closer to the first, upper end 143 than the second lower end 145 due to the fact that the filter insert 100 and the lid may need to be turned more than 180 degrees. The circumferential position of the lid 120 relative to the filter insert 100 is set via the position of the connection means 160, 161 relative to the key-lock structure 127, 128. Further, the circumferential position of the connection means 160, 161 is set relative to the first and second guiding means 140, 141 so that the key-lock structure 127, 128 matches when the filter insert 100 is pushed axially downwards for engaging the closing means 130 with the aperture 131.

Further, the lid 120 comprises a removal means 192 with a peripheral polygonal shape for engagement with a correspondingly designed removal tool for use in case the filter insert 100 and/or lid 120 is stuck to the filter housing 105 in a way that may not be overcome by use of the handle 134. The removal 192 is here in the form of an axial recess for not interfering with the space for the fingers of the service technician between the handle 134 and the upper surface 194 of the plate-shaped member. According to an alternative, the removal tool may be formed by an axial projection.

FIG. 9 is a partially cut perspective view from the top of the filter housing 105 according to a first embodiment example. The filter housing 105 has an access opening 158 for receipt of the filter insert 100 and wherein the filter housing lid 120 is arranged for opening and closing, respectively, the filter insert access opening 158. The filter housing 105 has a cylindrical wall 188 with a circular cross section. The diameter of the circular cylindrical wall 188 is matched to the outer periphery of the filter material body 102 establishing: a gap between them.

Figure 18:
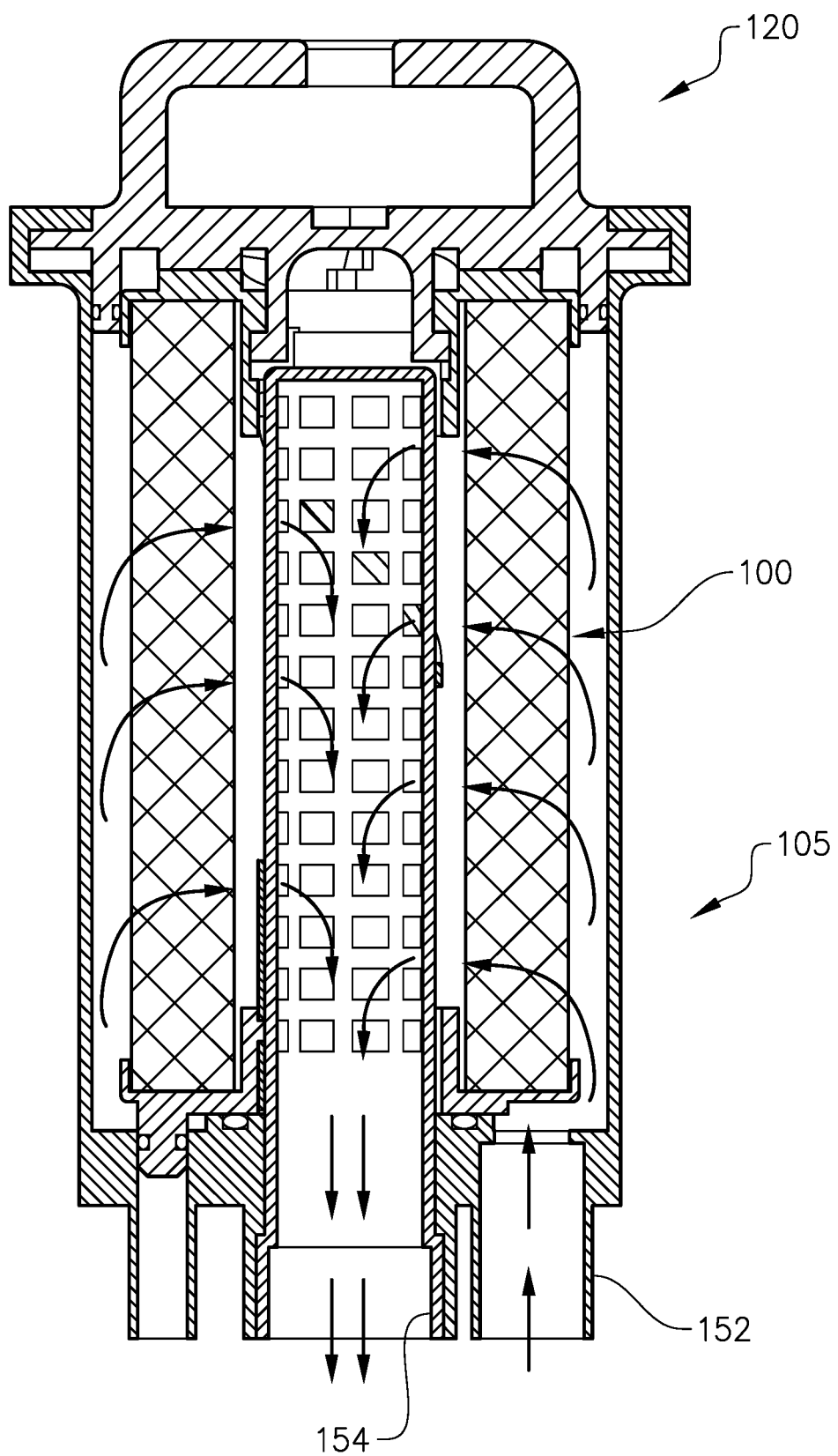

The filter housing 105 comprises an inlet 152 for receipt of a raw fluid to be filtered, which empties into a raw side of the filter housing, and an outlet or return 154, which starts at a clean side of the filter housing, for filtered clean fluid. The inlet 152 and outlet 154 are provided in a lower region 156 of the filter housing 105. The inlet 152 and outlet 154 are in communication different sides of the filter material body 102. The filter housing 105 further comprises a fluid permeable tubular central post 195 for being received in the central opening in the filter insert 100. The central post 195 is grid-shaped. More specifically, the outlet 154 is positioned radially centrally and adapted to match the position of the central opening in the fluid permeable central post 195. The outlet 154 is thus in fluid communication with an interior side of the fluid permeable tubular central post 195. Further, the inlet 152 is positioned radially eccentric in the bottom wall of the filter housing for distributing the fluid to a radially external side of the filter material body 102. The direction of the fluid inside the filter arrangement is disclosed in FIG. 18. Through the inlet 152, the fluid flows to a raw side of the filter housing (the radial gap between the filter insert 100 and the filter housing 105). By flowing through the filter material body 102, the liquid flows to the clean side of the filter housing (the radially interior space) while dirt particles, are retained in the filter material body 102. The filtered liquid flows off through the outlet (return) 154.

The filter housing 105 comprises means 190 forming part of the key-lock structure for fitting with the complimentary shaped plate shaped member 122 of the lid during a movement of the lid relative to the filter housing. More specifically, the filter housing 105 and the lid 120 comprise means complimentary shaped for engagement via a first linear movement of the lid and a consecutive turning movement of the lid. The key-lock means 190 is positioned at a free, open end of the filter housing 105, which end defines the access opening 158.

The radially extending projection 190 is plate-shaped and flat and extends in a plane perpendicular to the longitudinal direction 107 of the filter housing 105. Further, the radially extending projection 190 is arc-shaped, wherein the arc defines a radially outer surface of the plate-shaped portion 190. Further, the radially extending projection 190 has the external shape of a semi-circle. The shape and size of the radially extending projection 190 is matched to the seat 127 and the passage 128 and preferably the same or somewhat smaller in size for a tight fit.

Figure 10:
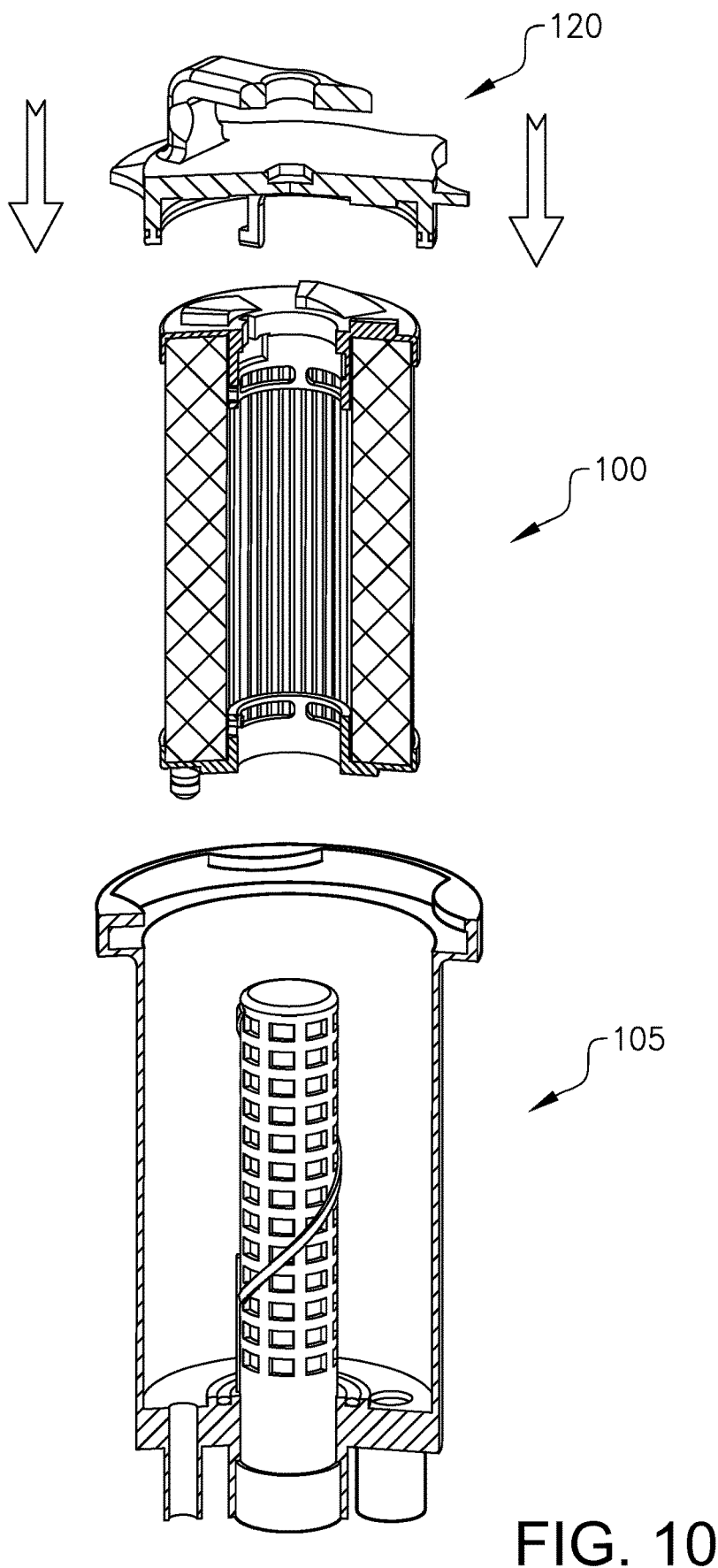
FIG. 10 is an exploded view of the filter arrangement according to a first embodiment example comprising the filter insert, lid and filter housing according to FIGS. 4-9, FIG. 11-12 discloses two relative states during a process for connecting the lid according to FIGS. 7-8 to the filter insert according to FIGS. 4-6, FIG. 13-17 discloses consecutive relative positions of the filter insert, lid and housing according to FIGS. 4-9 during insertion of the filter insert into the filter housing, FIG. 18 discloses the filter arrangement according to FIG. 10 in an operative position.

FIG. 10 is an exploded view of the filter arrangement 3 according to the first embodiment example comprising the filter insert 100, lid 120 and filter housing 105 according to FIGS. 1-9.

FIG. 13-18 discloses consecutive relative positions of the filter insert 100, lid 120 and housing 105 during insertion of the filter insert 100 into the housing. The lid 120 has first been connected to the filter insert 120 according to FIGS. 11-12. Thus, the filter insert 100 hangs below the lid 120. The unit comprising the lid 120 and the filter insert 100 is preferably operated holding only the lid 120 via the handle 134. Thus, the consecutive process for inserting the filter insert 100 into the filter housing 105 is performed by a technician by handling the lid 120 only via the handle 134.

Figure 13:
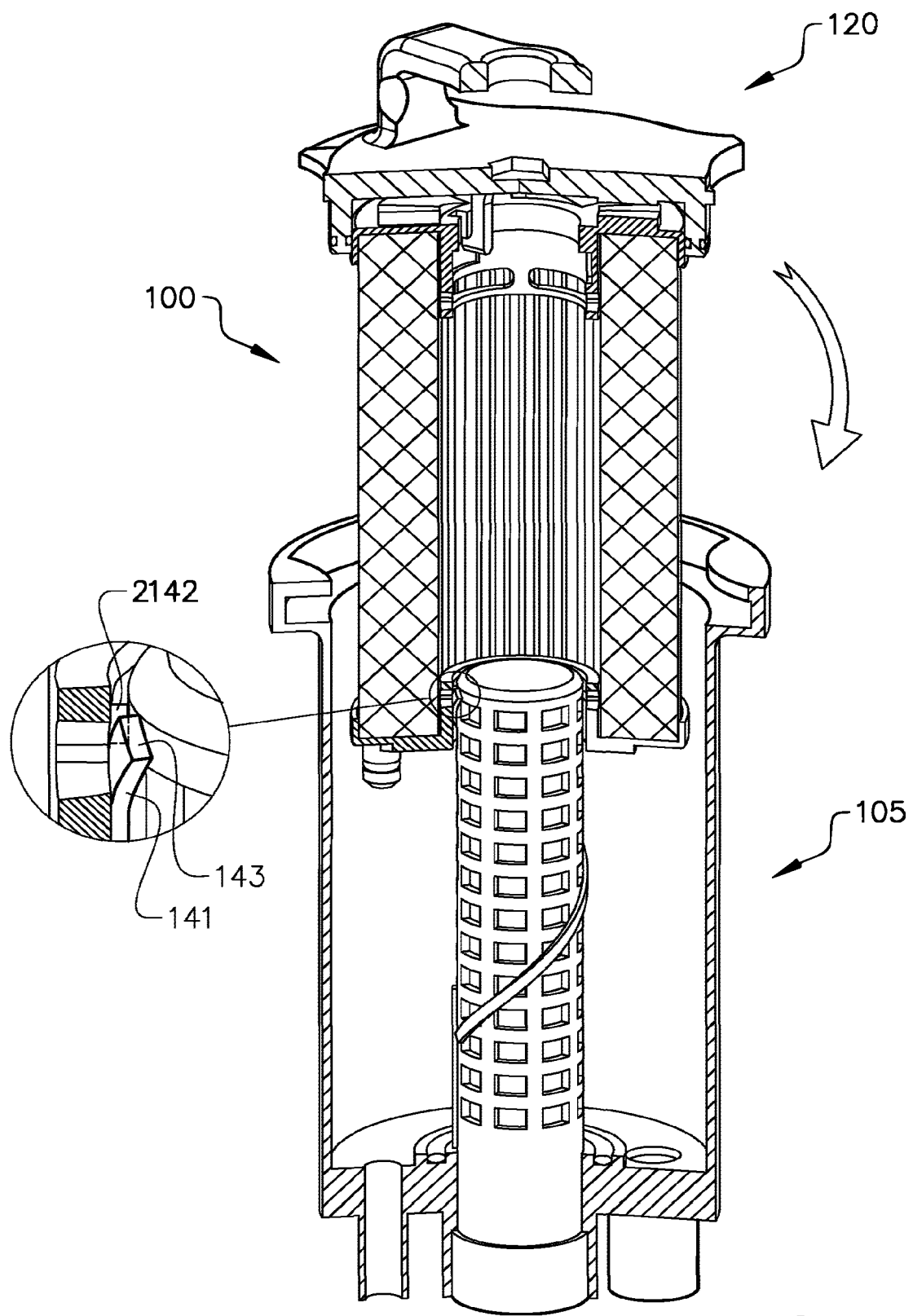

FIG. 13 discloses a first position of the filter insert 100 in the filter housing 105 after an axial movement. This axial movement is continued until the first guiding means 140 of the filter insert 100 contacts the second guiding means 141 of the filter housing 105. More specifically, this axial movement is continued until the radial projection 2142 contacts an upper surface 144 of the inclined guiding member 141. The filter insert 100 is then turned relative to the housing 105, see arrow, while it is pushed further into the housing, wherein the first guiding means 140 of the filter insert 100 is in gliding contact with the second guiding means 141 of the filter housing 105.

Figure 14:
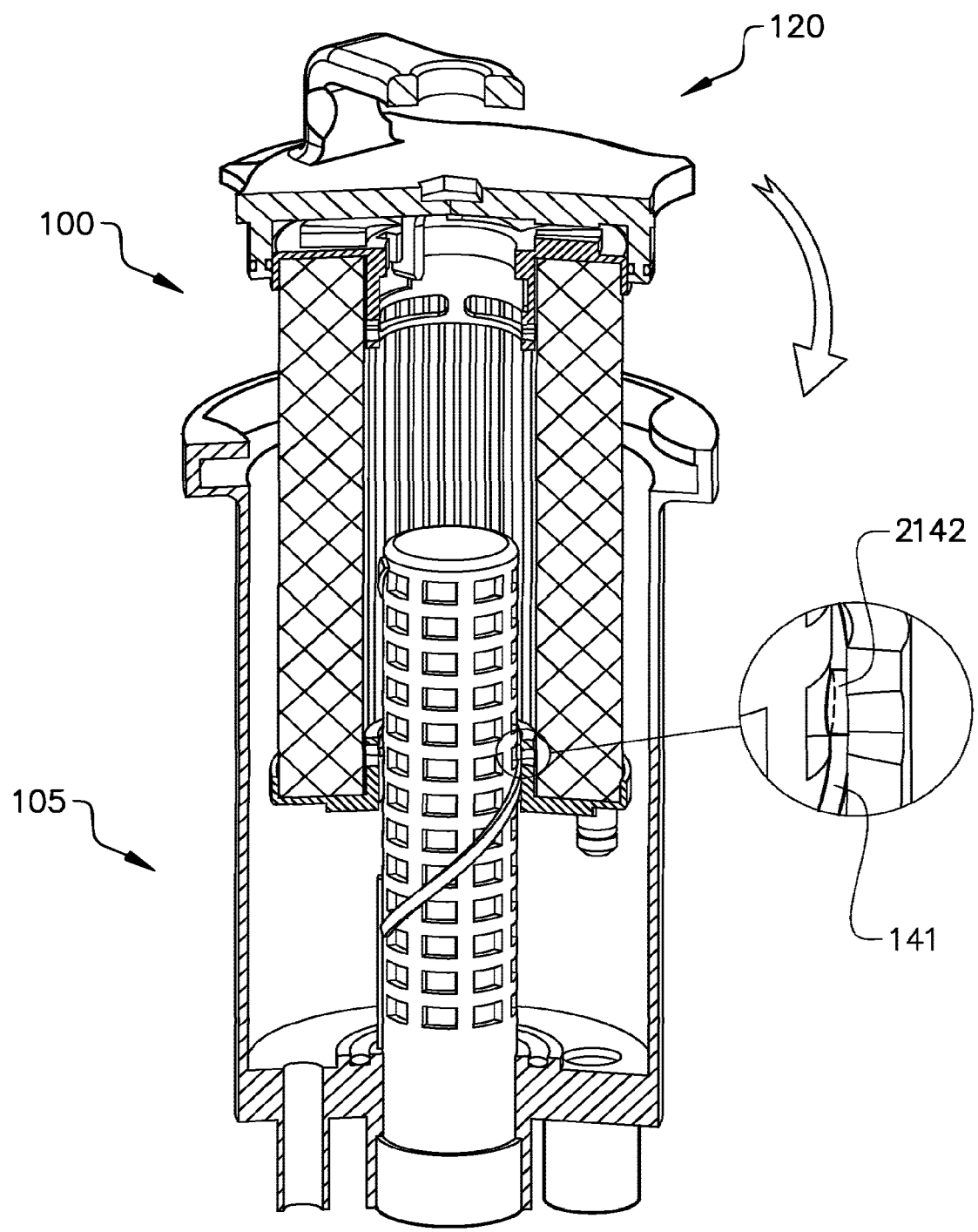

FIG. 14 discloses a second position of the filter insert 100 in the filter housing 105 after a turning movement of the lid 120 during the consecutive push of the filter insert 100 into the filter housing 105, wherein the radical projection 141 rides along the second guiding means 141. Thus, the lid 120 and the filter insert 100 moves in unison during the first turning movement.

Figure 15:
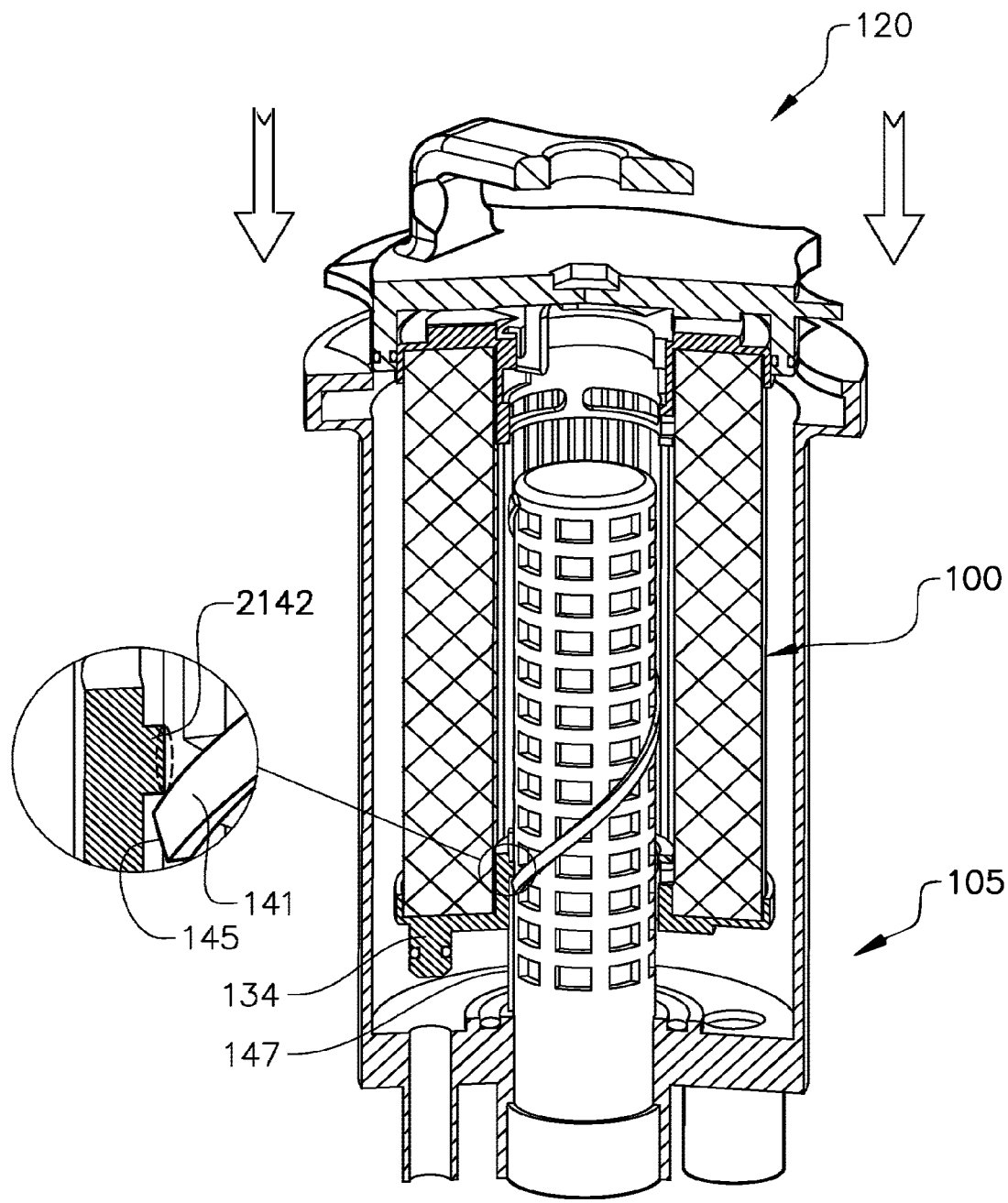

FIG. 15 discloses a second position of the filter insert 100 in the filter housing 105. More specifically, the radial projection 142 has reached the second axial end position 145 of the Second guiding means 141, wherein the turning movement of the filter insert 100 is ended. The radial projection 142 will leave the second guiding means 141 and continue to ride along a side surface of the axial guiding means 147, wherein the filter insert 100 will be moved in an axial direction in the filter housing 105, see arrow. The closing means 130 of the filter insert 100 is now axially aligned with the associated aperture 131.

Figure 16:
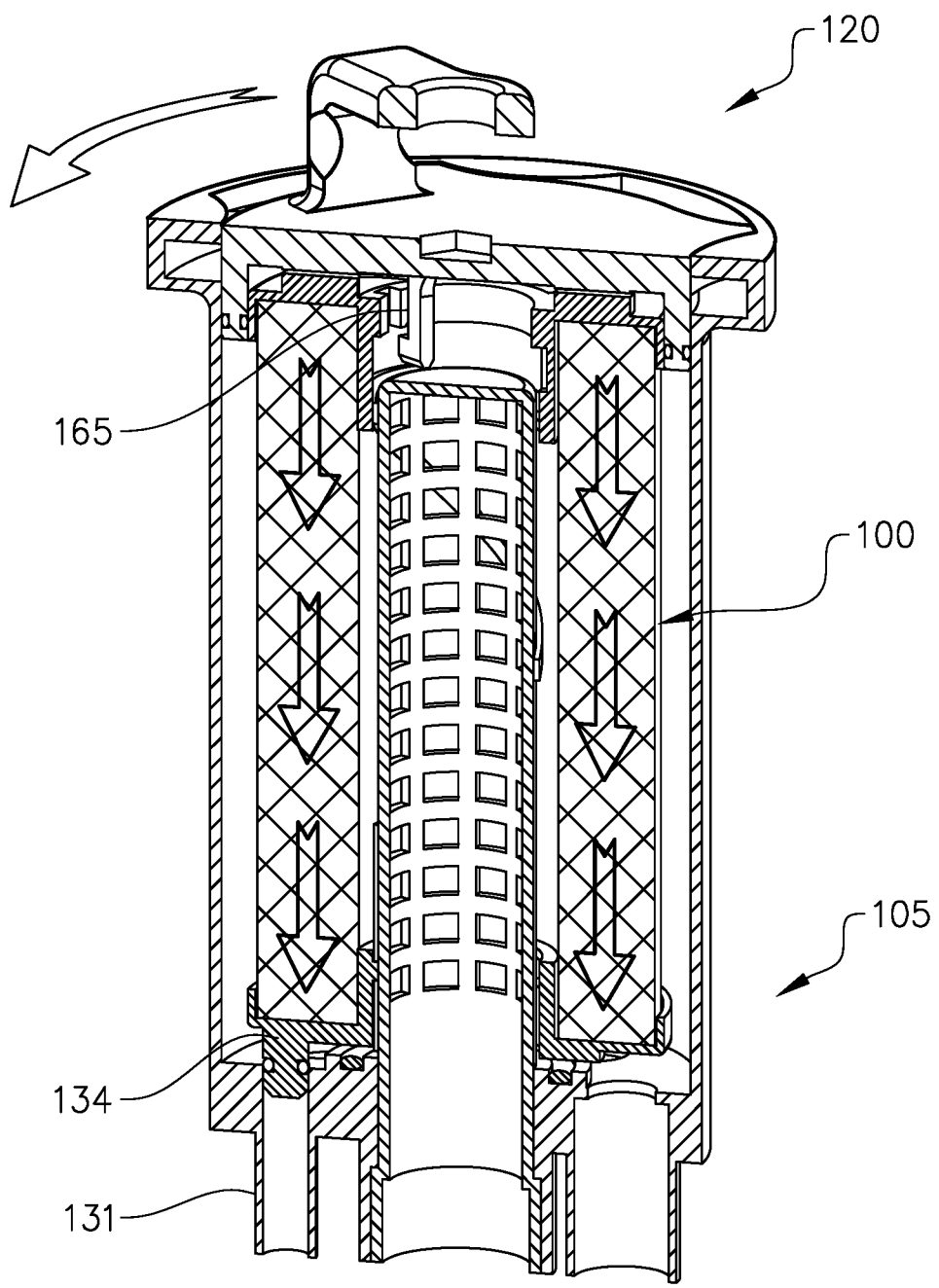
Figure 17:
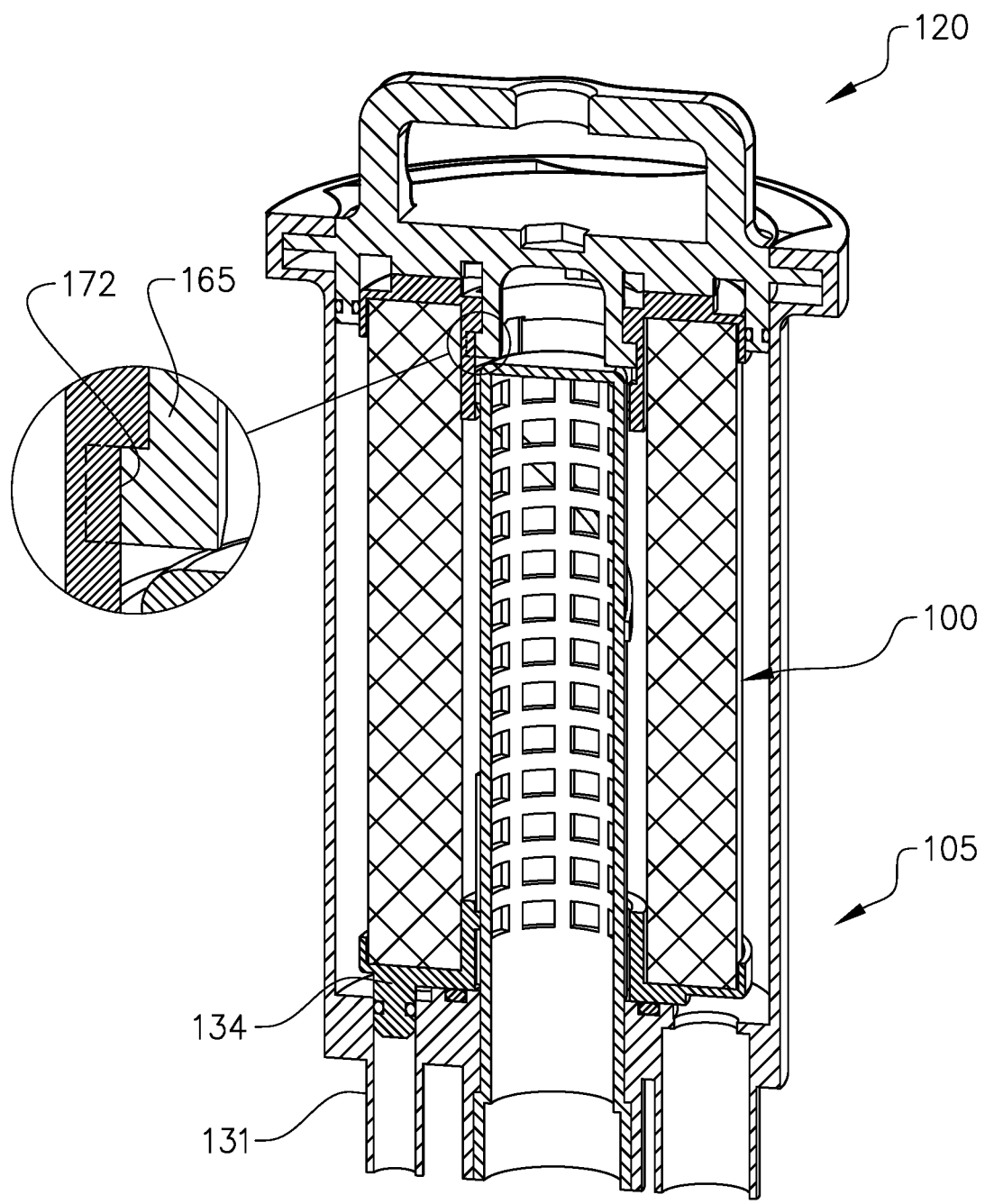

FIG. 16 discloses a third position of the filter insert 100 in the filter housing 105. The filter insert 100 has now been moved in an axial direction further into the filter housing 105 after completion of the turning movement when the radial projection 142 rode along the second guiding means 141. The key-lock structure 128, 190 is circumferentially matched during this axial movement so that the plate shaped member 122 of the lid 120 passes the radial projection 190. Note in FIG. 16 that the axial projections 165 from the lid has been pushed downwards from the seat during the axial movement of the filter insert 100 to an intermediate position and now contacts a lower surface of the opening 160. The dosing means 134 has now entered the aperture 131. The lid 120 is now turned, see bent arrow, wherein the filter insert 100 is moved in axial direction, see straight arrows, due to engagement of the actuation means 114, 115. Thus, the lid 120 is turned a second time after completion of the second axial movement. The second turning movement of the lid 120 is performed in an opposite circumferential direction in relation to the first turning movement FIG. 17 discloses a fourth position of the filter insert 100 in the filter housing 105. The radial projection 190 of the filter housing 105 has ended up in the seat 127 after the second turning movement of the lid 120. Further, the second actuation means 115 of the lid 120 engages the first actuation means 114 of the filter insert 100 during the second turning movement of the lid 120, wherein the filter insert 100 is moved axially downwards relative to the lid 120 and relative to the filter housing 105. Further, the closing means 130 of the filter insert 100 is moved into the aperture 131 during the axially downwards movement of the filter insert 100 relative to the filter housing 105. Note in FIG. 17 that the axial projections 165 from the lid has turned from the intermediate position during the second axial movement of the filter insert 100 and now contacts an opposite side surface of the opening 160.

Figure 19:
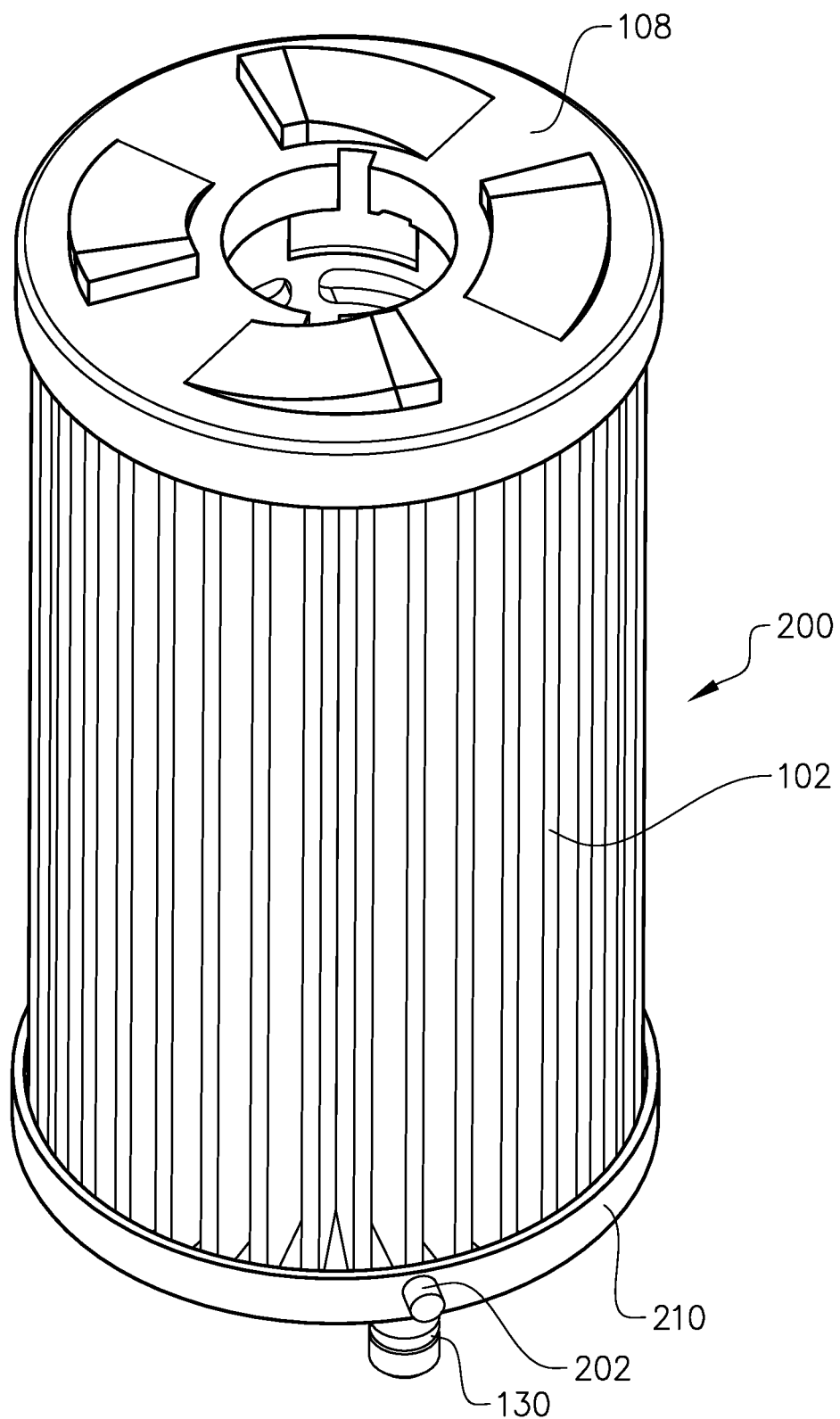
FIG. 19-20 shows a perspective view from the top and bottom, respectively, of a filter insert according to a second embodiment example.
Figure 20:
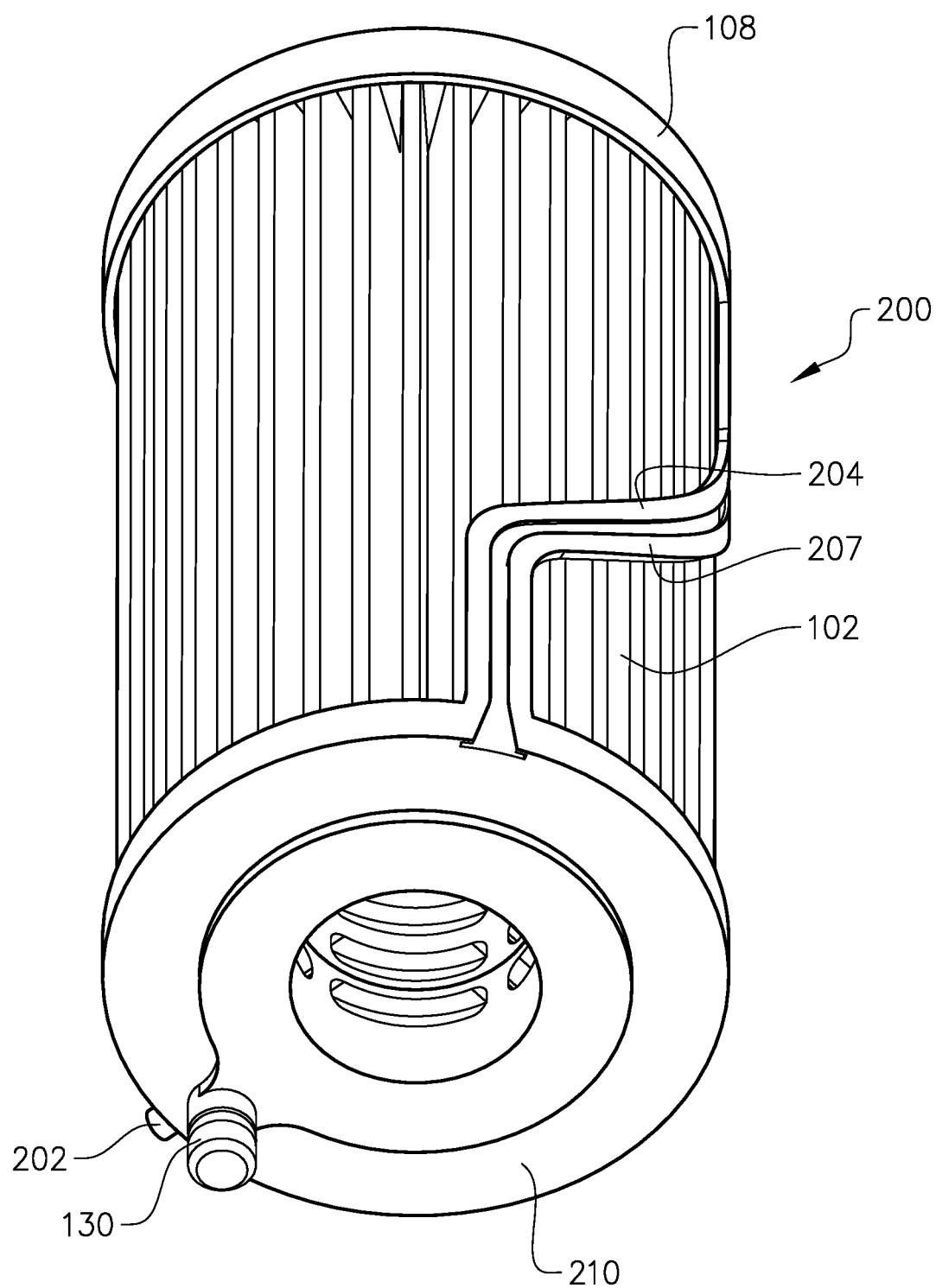
Figure 21:
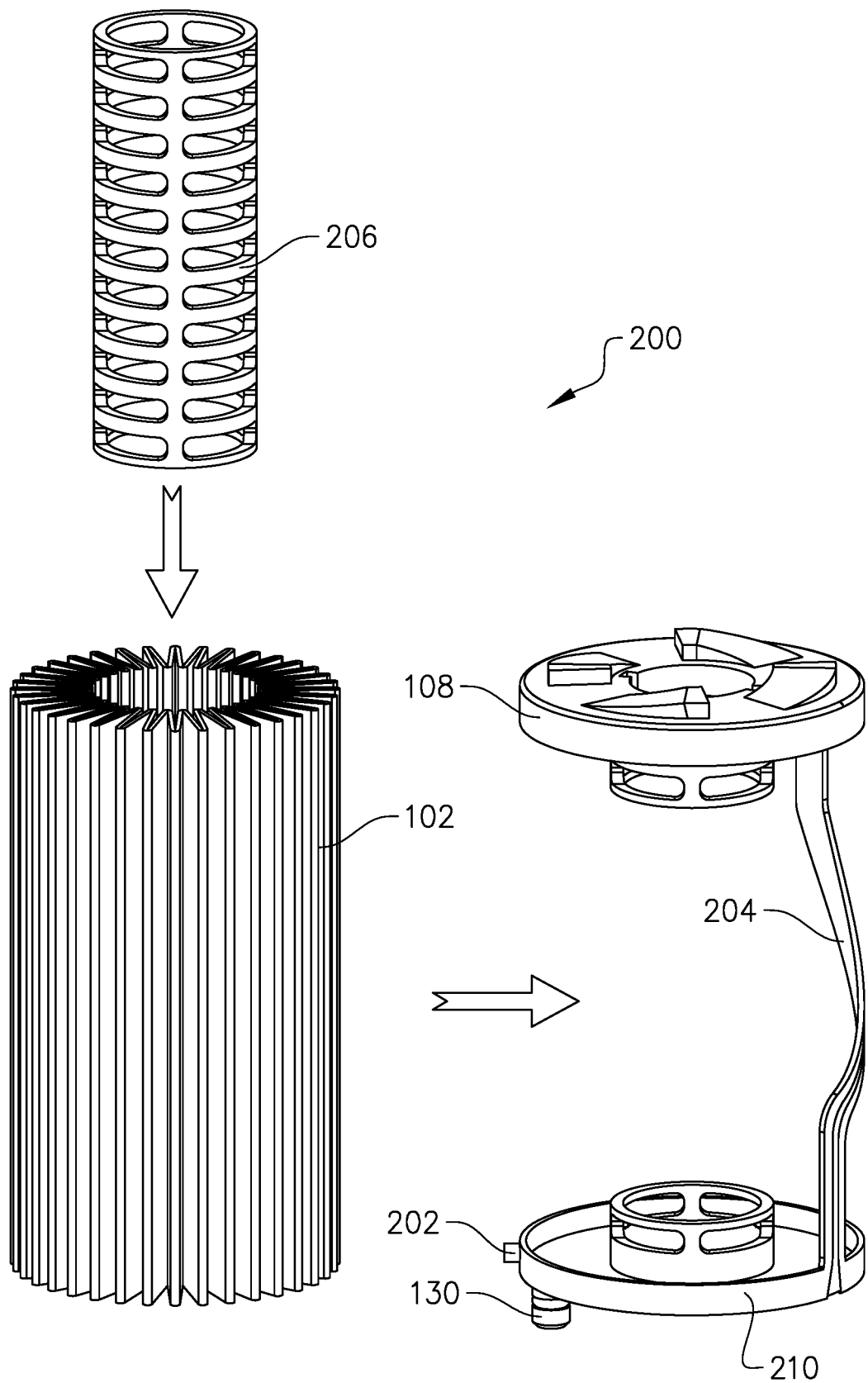
FIG. 21 is an exploded perspective view of the filter insert according to the second embodiment example, and FIG. 22 discloses a filter housing according to a second embodiment example.
Figure 22:
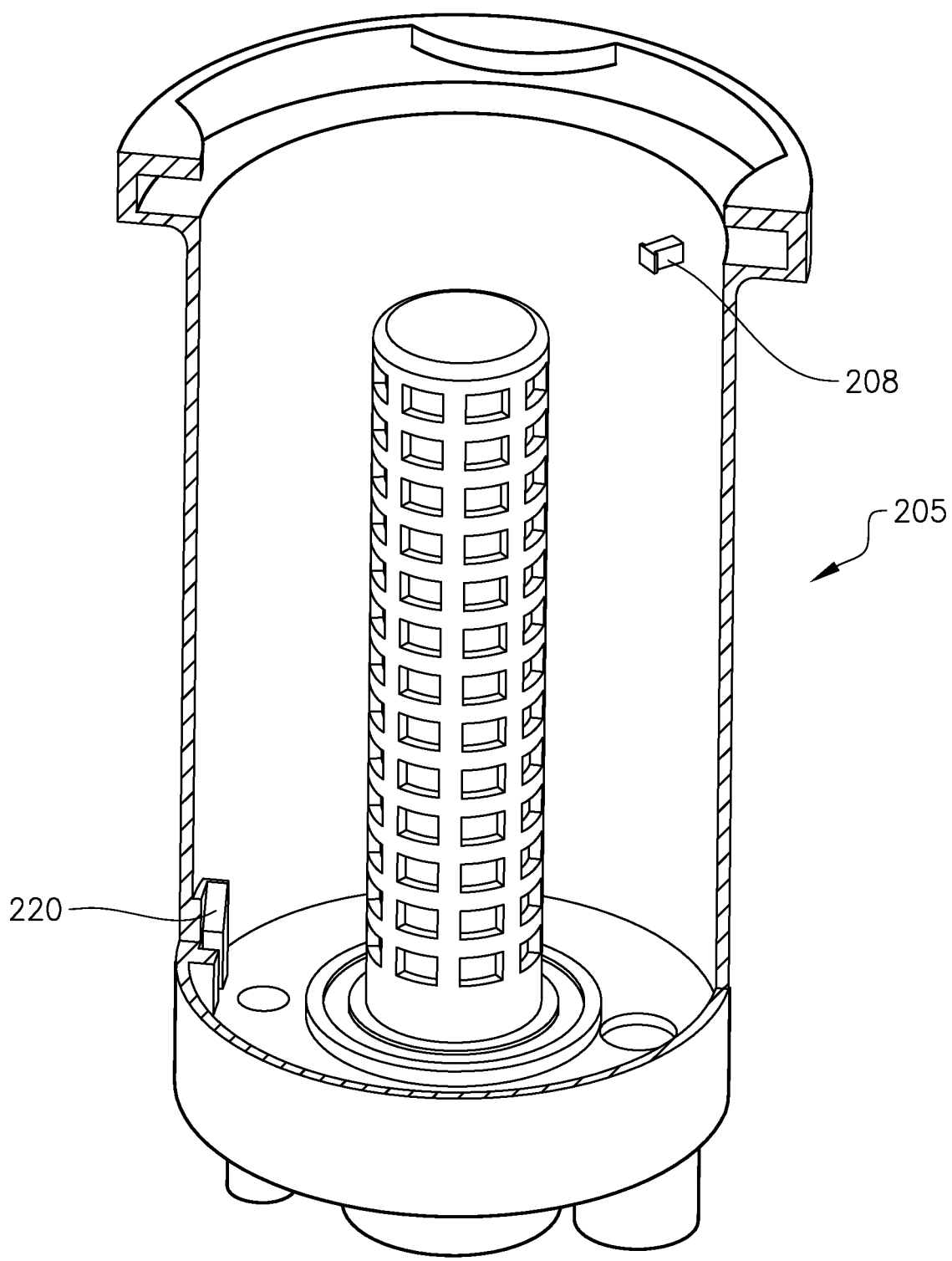

FIGS. 19-20 show a perspective view from the top and bottom, respectively, of a filter insert 200 according to a second embodiment example in similar views as in FIGS. 4-5. FIG. 21 shows the fitter insert 200 according to FIGS. 19-20 in an exploded view. Further, FIG. 22 shows the filter housing 205 according to a second embodiment example. Only the main differences in relation to the first embodiment examples will be described below.

The filter insert 200 comprises a first guiding means 204 for guiding the filter insert 200 relative to the filter housing 205 during at least the first turning movement of the lid 120. The first guiding means 204 is adapted for engagement with a second guiding means 208 of the filter housing 205. The first guiding means 204 is formed by an elongated guiding member and the second guiding means 208 is formed by a radially inwards extending protection from an inner wall of the filter housing 205. The first guiding means 204 has a section 207 with an axial extension and a radial extension. More specifically, the first guiding means 204 is helically shaped. The first guiding means 204 forms a guide member rigidly connected to the first end panel 108 and the second end panel 210.

The filter insert 200 comprises a third guiding means 202 for guiding the closing means 130 towards and into the aperture 131 during the second turning movement of the lid 120. The filter housing 205 comprises a complimentary shaped fourth guiding means 220 for engagement with the third guiding means 202, see FIG. 22. The complimentary shaped fourth guiding means 220 of the filter housing 205 is formed in an inner wall of the filter housing 205. The third guiding means 202 of the filter insert 200 comprises a radial projection extending from a radially outer circumference of the filter insert 200 and the complimentary shaped fourth guiding means 220 of the filter housing 205 forms an axially extending guiding channel for receipt of the radial projection. More specifically, the projection 202 extends radially from a second end panel 210. An upper portion of the guiding channel has a downwards tapering shape for secure receipt of the radial projection.

The filter insert 200 comprises a central tubular structure 206, see FIG. 21. The central tubular structure 206 is positioned inside of the filter material body 102 and in contact with an inner periphery of the filter material body 102. The central tubular structure 206 supports the filter material body 102 and reduces risk of collapsing of the filter material body 102. The central tubular structure 206 is rigidly connected to the end panels 108, 210. The central tubular structure 206 is fluid permeable and in the shown example grid-shaped for allowing passing of oil during filter operation. According to one alternative, the central tubular structure 206 is detachably connected to the end panels 108, 210.

Figure 23:
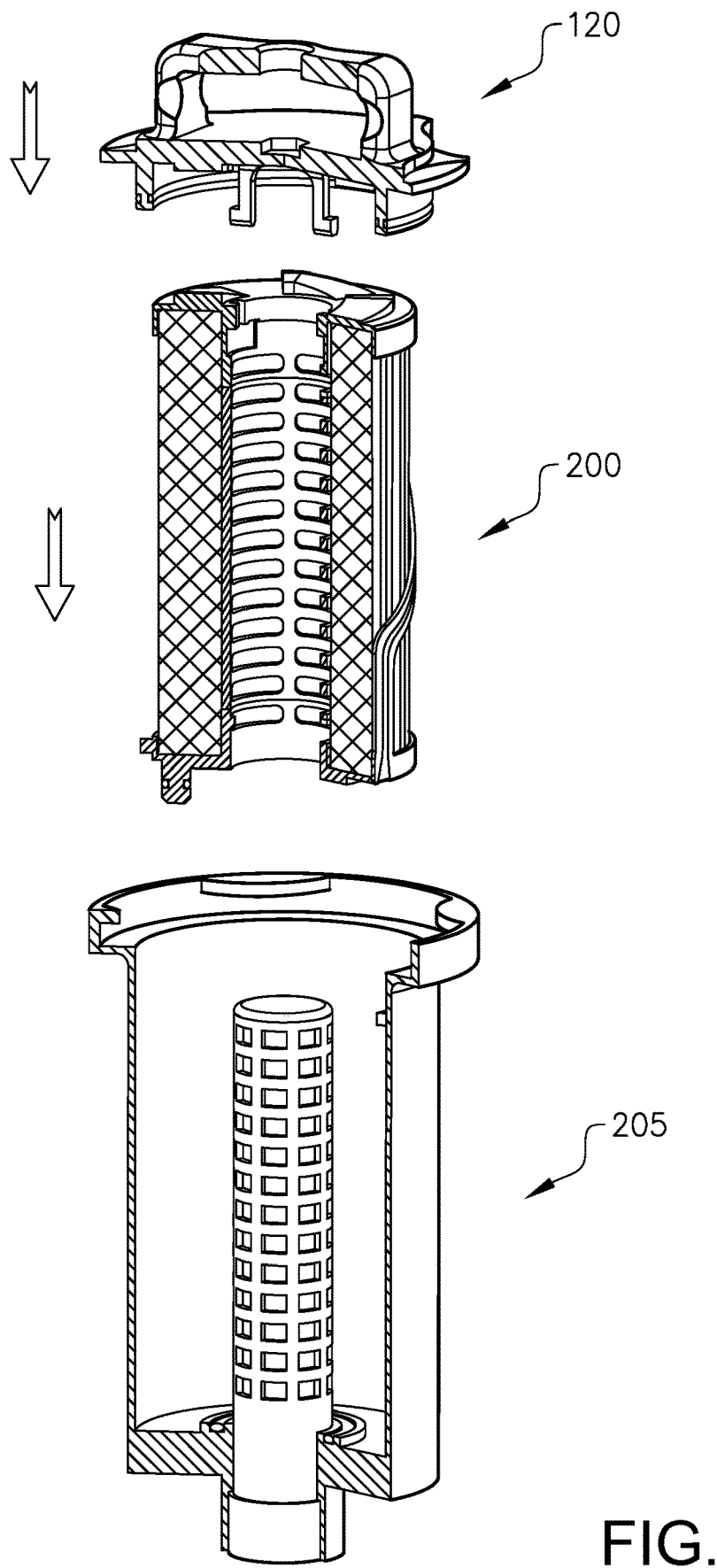
FIG. 23 is an exploded perspective view of the filter insert according to FIGS. 20-21, the lid according to FIGS. 7-8 and the filter housing according to FIG. 22.

FIG. 23 is an exploded perspective view of the filter insert 200 according to FIGS. 19-21, the lid 120 according to FIGS. 7-8 and the filter housing 205 according to FIG. 22. It may be readily understood that the consecutive relative positions of engaging parts of the filter insert and the filter housing and the lid, respectively, during insertion is similar to what has been described with regard to the first embodiment example and shown in FIGS. 13-17.

It is to be understood that the present invention is not limited to the embodiments described above and illustrated in the drawings; rather, the skilled person will recognize that many changes and modifications may be made within the scope of the appended claims.

According to one alternative embodiment, the first guiding means is provided on an outer circumference of the filter material body. Thus, the first guiding means is provided on a radially outer surface of the filter material body. In other words, the first guiding means is provided on a surface of the filter material body exposed radially outwards. In other words, the first guiding means is provided on an outer envelope surface of the filter material body. Further, the complimentary second guiding means in the filter housing is then provided on an inner circumferential wall of the filter housing. Further, the first guiding means may comprise a recess or other guiding member instead of the radial projection, wherein the second guiding means instead comprises the radial projection. In a similar manner, the position and design of the third and fourth guiding means may also be switched.

According to one alternative embodiment, both the first guiding means of the first embodiment of the filter insert 100 and the first guiding means of the second embodiment of the filter insert 200 may be provided on a filter insert. In a similar manner, both the second guiding means of the first embodiment of the filter housing 105 and the second guiding means of the second embodiment of the filter housing 205 may be provided on a filter housing.

The invention claimed is:

1. A filter insert for being removably arranged in a filter housing, wherein the filter insert comprises a first actuator positioned at a first end of the filter insert, wherein the first actuator comprises an external contact surface defining a projection or recess,
   wherein the projection or recess forms part of a structure with varying extension in an axial direction of the filter insert along a circumferential direction of the filter insert such that the first actuator is adapted for being actuated by a corresponding second actuator of a filter housing lid for controlling a relative axial movement between the filter insert and the filter housing lid and
   wherein the filter insert further comprises a first guide arranged for engaging a corresponding second guide of the filter housing for guiding the filter insert relative to the filter housing during insertion of the filter insert into the filter housing,
   wherein the first guide is separate from the first actuator and further axially spaced from the first actuator, wherein the filter insert comprises a first end panel at the first end of the filter insert and a second end panel at a second end of the filter insert, the second end panel includes a tubular structure, wherein the first guide is an integral part of or is rigidly connected to the tubular structure.

2. A filter insert according to claim 1, wherein the first actuator is eccentrically positioned at the first end of the filter insert.

3. A filter insert according to claim 1, wherein the first actuator is rigidly attached to or forms an integral part of the first end panel.

4. A filter insert according to claim 1, wherein the filter insert comprises a closer positioned at a second end of the filter insert, opposite the first end, for controlling opening and closing, respectively, of an aperture in a bottom region of the filter housing.

5. A filter insert according to claim 4, wherein the closer is formed by a body arranged to sealingly engage the aperture.

6. A filter insert according to claim 4, wherein the closer is rigidly attached to or forms an integral part of the second end panel.

7. A filter insert according to claim 6, wherein the closer is arranged to project in an axial direction of the filter insert from a main portion of the second end panel.

8. A filter insert according to claim 4, wherein the closer forms a drainage valve actuator.

9. A filter insert according to claim 4, wherein the first actuator comprising the external contact surface defining a projection or recess, wherein the projection or recess forms part of a structure with varying extension in the axial direction of the filter insert following along the circumferential direction of the filter insert; the first actuator is adapted for transferring a turning movement of the filter housing lid to a linear movement for closing and opening respectively, the aperture via the closer.

10. A filter insert according to claim 1, wherein the first guide is adapted for guiding the filter insert along a path, which has an axial component and a circumferential component relative to the filter housing.

11. A filter insert according to claim 1, wherein the first guide comprises at least one radially extending projection for engagement with an inclined surface provided in the filter housing and/or
  wherein the first guide comprises at least one inclined surface extending in a circumferential direction and an axial direction for receiving a radially extending projection provided in the filter housing.

12. A filter insert according to claim 1, wherein the first guide is adapted to guide the filter insert in a first circumferential direction in relation to the filter housing.

13. A filter insert according to claim 1, wherein the filter insert comprises a body and wherein at least a part of the first guide is arranged at a circumference of the filter insert.

14. A filter insert according to claim 4, wherein the first guide is arranged for engaging the corresponding second guide of the filter housing for guiding the filter insert relative to the aperture.

15. A filter insert according to claim 14, wherein an end of the first guide adjacent the closer is positioned axially spaced from the closer for allowing a linear movement of the filter insert relative to the filter housing for opening and closing, respectively, the aperture via the closer.

16. A filter insert according to claim 1, wherein the first guide and the first actuator are adapted to control separate movements of the filter insert relative to the filter housing and filter housing lid, respectively so that, during installation of the filter insert, the filter insert is first moved by the first guide followed by the first actuator.

17. A filter insert according to claim 1, wherein the first guide and the first actuator are adapted to control separate movements of the filter insert relative to the filter housing and filter housing lid, respectively in opposite circumferential directions.

18. A filter insert according to claim 1, wherein the filter insert comprises a first connector for engaging a corresponding second connector of the filter housing lid for a connection to the filter housing lid.

19. A filter insert according to claim 18, wherein the first connector comprises a wall portion defining at least one opening for receipt of a projection extending from the lid, wherein the opening defined by the wall portion has a circumferential extension.

20. A filter insert according to claim 19, wherein the opening of the first connector has an axial extension.

21. A filter insert according to claim 18, wherein the first connector comprises a wall portion defining at least one opening for receipt of a projection extending from the lid, wherein the opening defined by the wall portion has a circumferential extension which is greater than a circumferential extension of an end portion of the projection to allow a relative circumferential movement between the filter insert and the filter housing lid during the movement of the filter insert controlled by the first actuator relative to the filter housing lid, and wherein the wall portion of first connector comprises a seat for the end portion of the projection wherein the seat and the projection are designed and shaped to prevent a relative circumferential movement between the filter insert and the filter housing lid during the movement guided by the first guide of the filter insert relative to the filter housing lid.

22. A filter insert according to claim 18, wherein the first connector comprises a wall portion with at least one opening for receipt of a projection extending from the lid.

23. A filter insert according to claim 1, wherein the filter insert has a third guiding means adapted for engagement of a fourth guiding means of the filter housing and wherein the third guiding means is adapted for guiding the filter insert in an axial direction of the filter housing during the engagement of the first and second actuation means (140, 141) for controlling the relative axial movement between the filter insert and the filter housing lid.

24. A filter insert according to claim 1, wherein the filter insert is adapted for filtering a fluid for an internal combustion engine.

25. A filter an arrangement comprising a filter insert according to claim 1, and further comprising a filter housing lid, which is adapted for closing a filter insert access end of the filter housing, wherein the lid comprises the second actuation means for contacting the first actuation means at the first end of the filter insert, and wherein the second actuation means is complimentary shaped to the first actuation means for controlling a relative axial movement between the filter insert and the filter housing lid.

26. A filter arrangement according to claim 25, wherein at least one of the first and second actuation means has a varying extension in a center axis direction of the lid and/or an axial direction of the filter insert along a cirumferential direction for controlling an axial movement of the filter insert during a turning movement of the lid.

27. A filter arrangement according to claim 25, wherein the lid comprises a plate shaped member and wherein the second actuation means comprises at least one projection extending from the plate shaped member in the direction of a center axis of the lid and wherein the projection forms a ramp in the circumferential direction of the lid.

28. A filter arrangement according to claim 25, wherein the filter housing lid comprises a first fastening means for fastening to a corresponding second fastening means of the filter housing and that the first fastening means is separate from the second actuation means.

29. A filter arrangement according to claim 28, wherein the first fastening means is provided at an external peripheral edge of the lid.

30. A filter arrangement according to claim 27, wherein the first fastening means is adapted for movement of the lid relative to the filter housing in two consecutive steps, namely a first axial movement and a second circumferential movement, during installation.

31. A filter arrangement according to claim 28, wherein the first fastening means forms part of a key-lock structure for fitting with a corresponding shaped part of the filter housing during a movement of the filter lid towards the filter housing.

32. A filter arrangement according to claim 25, wherein the lid comprises a handle at an opposite side of the lid relative to the second actuation means.

33. A filter arrangement according to claim 25, wherein the filter arrangement further comprising a filter housing with an access opening for receipt of the filter insert and wherein the filter housing lid is arranged for opening and closing, respectively, the filter insert access opening.

34. A filter arrangement according to claim 27, wherein the filter housing lid comprises a first fastening means for fastening to a corresponding second fastening means of the filter housing and that the first fastening means is separate from the second actuation means, wherein the filter arrangement further comprising a filter housing with an access opening for receipt of the filter insert and wherein the filter housing lid is arranged for opening and closing, respectively, the filter insert access opening, and wherein the filter housing comprises the second fastening means and wherein the first fastening means forms a passage of the plate shape member and the second fastening means comprises a radially inwards projecting element, and wherein the passage is configured for guiding the plate shaped member relative to the projecting element during the relative axial movement of the plate shaped member past the projecting element in such a way in relation to the first and second actuation means that the movement of the filter insert relative to the lid controlled by the first and second actuation means is actuated when the lid is fastened and released, respectively relative to the filter housing via the first and second fastening means.

35. A filter arrangement according to claim 33, wherein the filter housing comprises an aperture in a bottom region of the filter housing.

36. A filter arrangement according to claim 32, wherein the filter housing comprises the second guiding means for engagement of a first guiding means of the filter insert for guiding the filter insert relative to the filter housing.

37. A filter arrangement according to claim 32, wherein the filter housing comprises the fourth guiding means formed in an inner wall of the filter housing for engagement of a third guiding means comprising a radial projection extending from a radially outer circumference of the filter insert for guiding the filter insert relative to the filter housing and wherein the fourth guiding means forms an axially extending guiding channel for receipt of the radial projection of the third guiding means for guiding the filter insert in an axial direction of the filter housing during the engagement of the first and second actuation means for controlling the relative axial movement between the filter insert and the filter housing lid.

38. An internal combustion engine system comprising an internal combustion engine and a filter arrangement according to claim 26 operatively connected to the internal combustion engine for cleaning a fluid for the internal combustion engine.

39. A filter insert according to claim 1, wherein the first actuator is integrated with the first end panel, and the first guide includes at least one radially extending projection.

* * * * *